US012609108B2

(12) United States Patent
Shastry et al.

(10) Patent No.: US 12,609,108 B2
(45) Date of Patent: *Apr. 21, 2026

(54) ADAPTIVE SELF-TRAINED COMPUTER ENGINES WITH ASSOCIATED DATABASES AND METHODS OF USE THEREOF

(71) Applicant: VOXSMART LIMITED, London (GB)

(72) Inventors: Tejas Shastry, Chicago, IL (US); Anthony Tassone, Saint Charles, IL (US); Patrick Kuca, Chicago, IL (US); Svyatoslav Vergun, Morton Grove, IL (US)

(73) Assignee: VOXSMART LIMITED, London (GB)

( * ) Notice: Subject to any disclaimer, the term of this patent is extended or adjusted under 35 U.S.C. 154(b) by 666 days.

This patent is subject to a terminal disclaimer.

(21) Appl. No.: 17/444,683

(22) Filed: Aug. 9, 2021

(65) Prior Publication Data

US 2021/0375266 A1 Dec. 2, 2021

Related U.S. Application Data

(63) Continuation of application No. 15/952,802, filed on Apr. 13, 2018, now Pat. No. 11,114,088, which is a (Continued)

(51) Int. Cl.
*G10L 15/06* (2013.01)
*G10L 15/02* (2006.01)
(Continued)

(52) U.S. Cl.
CPC ............ *G10L 15/063* (2013.01); *G10L 15/02* (2013.01); *G10L 15/08* (2013.01); *G10L 15/187* (2013.01);
(Continued)

(58) Field of Classification Search
None
See application file for complete search history.

(56) References Cited

U.S. PATENT DOCUMENTS

| | | | | |
|---|---|---|---|---|
| 5,855,000 A | * | 12/1998 | Waibel | G06V 10/98 704/E15.04 |
| 6,076,054 A | * | 6/2000 | Vysotsky | G10L 15/065 704/243 |

(Continued)

*Primary Examiner* — Jonathan C Kim
(74) *Attorney, Agent, or Firm* — PIERSON FERDINAND LLP; Keats Quinalty

(57) ABSTRACT

In some embodiments, the present invention provides for an exemplary computer system which includes at least the following components: an adaptive self-trained computer engine programmed, during a training stage, to electronically receive an initial speech audio data generated by a microphone of a computing device; dynamically segment the initial speech audio data and the corresponding initial text into a plurality of user phonemes; dynamically associate a plurality of first timestamps with the plurality of user-specific subject-specific phonemes; and, during a transcription stage, electronically receive to-be-transcribed speech audio data of at least one user; dynamically split the to-be transcribed speech audio data into a plurality of to-be-transcribed speech audio segments; dynamically assigning each timestamped to-be-transcribed speech audio segment to a particular core of the multi-core processor; and dynamically transcribing, in parallel, the plurality of timestamped to-be-transcribed speech audio segments based on the user-specific subject-specific speech training model.

20 Claims, 13 Drawing Sheets

Related U.S. Application Data continuation of application No. 15/682,232, filed on Aug. 21, 2017, now abandoned, which is a continuation of application No. 15/477,909, filed on Apr. 3, 2017, now Pat. No. 9,741,337.

(51) Int. Cl.

| | |
|---|---|
| *G10L 15/08* | (2006.01) |
| *G10L 15/187* | (2013.01) |
| *G10L 15/26* | (2006.01) |
| *G10L 15/28* | (2013.01) |
| *G10L 17/04* | (2013.01) |
| *G10L 25/18* | (2013.01) |

(52) U.S. Cl.

CPC .............. *G10L 15/26* (2013.01); *G10L 15/28* (2013.01); *G10L 17/04* (2013.01); *G10L 25/18* (2013.01); *G10L 2015/025* (2013.01); *G10L 2015/088* (2013.01)

(56) References Cited

U.S. PATENT DOCUMENTS

| | | | | |
|---|---|---|---|---|
| 6,101,467 | A * | 8/2000 | Bartosik ................. | G10L 15/26 704/235 |
| 6,424,946 | B1 * | 7/2002 | Tritschler ............... | G10L 15/26 707/E17.058 |
| 6,748,356 | B1 * | 6/2004 | Beigi .................... | G10L 21/028 704/250 |
| 7,881,930 | B2 * | 2/2011 | Faisman ............... | G10L 15/065 704/235 |
| 8,423,361 | B1 * | 4/2013 | Chang .................... | G10L 15/32 704/235 |
| 8,447,599 | B2 * | 5/2013 | Reding .................. | G10L 15/30 704/235 |
| 8,566,259 | B2 * | 10/2013 | Chong .................. | G06N 20/00 706/45 |
| 9,286,886 | B2 * | 3/2016 | Minnis .................... | G10L 13/10 |
| 9,548,048 | B1 * | 1/2017 | Solh ....................... | G06V 40/20 |
| 9,584,946 | B1 * | 2/2017 | Lyren .................... | H02M 1/08 |
| 9,672,827 | B1 * | 6/2017 | Jheeta .................. | G06F 16/338 |
| 9,741,337 | B1 * | 8/2017 | Shastry .................. | G10L 17/04 |
| 11,114,088 | B2 * | 9/2021 | Shastry .................. | G10L 17/04 |
| 2002/0091517 | A1 * | 7/2002 | Frank .................... | G10L 21/028 704/E21.013 |
| 2002/0193994 | A1 * | 12/2002 | Kibre .................... | G10L 13/047 704/260 |
| 2003/0144837 | A1 * | 7/2003 | Basson .................. | G10L 15/32 704/E15.047 |
| 2005/0159949 | A1 * | 7/2005 | Yu ........................ | G10L 15/065 704/235 |
| 2006/0041427 | A1 * | 2/2006 | Yegnanarayanan ..... | G10L 15/26 704/235 |
| 2006/0074656 | A1 * | 4/2006 | Mathias .................. | G10L 15/02 704/243 |
| 2006/0149558 | A1 * | 7/2006 | Kahn .................... | G10L 15/063 704/278 |
| 2007/0033027 | A1 * | 2/2007 | Yao ........................ | G10L 15/20 704/E15.039 |
| 2007/0055526 | A1 * | 3/2007 | Eide ........................ | G10L 13/10 704/260 |
| 2009/0125899 | A1 * | 5/2009 | Unfried .................. | G10L 15/065 704/235 |
| 2010/0004930 | A1 * | 1/2010 | Strope .................... | G10L 15/01 704/251 |
| 2010/0023329 | A1 * | 1/2010 | Onishi .................... | G10L 15/07 704/E15.001 |
| 2010/0268534 | A1 * | 10/2010 | Kishan Thambiratnam ................ | G10L 15/26 704/235 |
| 2011/0119059 | A1 * | 5/2011 | Ljolje .................... | G10L 15/063 704/250 |
| 2012/0130717 | A1 * | 5/2012 | Xu .......................... | G06F 3/167 345/473 |
| 2012/0191457 | A1 * | 7/2012 | Minnis .................... | G10L 13/10 704/E13.011 |
| 2013/0124984 | A1 * | 5/2013 | Kuspa .................. | H04N 21/435 715/255 |
| 2013/0144603 | A1 * | 6/2013 | Lord ...................... | H04L 67/306 704/235 |
| 2014/0039871 | A1 * | 2/2014 | Crawford ................ | G06F 40/40 704/2 |
| 2014/0074467 | A1 * | 3/2014 | Ziv ........................ | G10L 25/51 704/235 |
| 2014/0122081 | A1 * | 5/2014 | Kaszczuk ............... | G10L 13/08 704/260 |
| 2014/0365216 | A1 * | 12/2014 | Gruber .................. | G10L 13/027 704/235 |
| 2015/0058019 | A1 * | 2/2015 | Chen ........................ | G10L 13/08 704/260 |
| 2015/0066502 | A1 * | 3/2015 | Achituv .................. | G10L 15/01 704/235 |
| 2015/0170642 | A1 * | 6/2015 | Peng ...................... | G10L 15/187 704/235 |
| 2015/0235639 | A1 * | 8/2015 | Ljolje .................... | G10L 15/07 704/244 |
| 2015/0243278 | A1 * | 8/2015 | Kibre .................... | G10L 15/187 704/243 |
| 2015/0371632 | A1 * | 12/2015 | Skobeltsyn ......... | G10L 15/1815 704/251 |
| 2016/0071520 | A1 * | 3/2016 | Hayakawa .............. | G10L 17/04 704/247 |
| 2016/0217792 | A1 * | 7/2016 | Gorodetski ............. | G10L 17/04 |
| 2016/0240198 | A1 * | 8/2016 | Jo .......................... | G10L 19/008 |
| 2016/0248768 | A1 * | 8/2016 | McLaren ................ | G10L 17/22 |
| 2016/0275944 | A1 * | 9/2016 | Yoshida .................. | G10L 15/10 |
| 2017/0084295 | A1 * | 3/2017 | Tsiartas .................. | G10L 17/08 |
| 2017/0160813 | A1 * | 6/2017 | Divakaran .............. | G10L 15/22 |
| 2017/0169812 | A1 * | 6/2017 | Lample ............... | G10L 15/183 |
| 2017/0206808 | A1 * | 7/2017 | Engelke ............ | H04M 3/42391 |
| 2017/0221475 | A1 * | 8/2017 | Bruguier .............. | G10L 15/065 |
| 2017/0270086 | A1 * | 9/2017 | Fume ...................... | G10L 15/26 |
| 2018/0033426 | A1 * | 2/2018 | Kapralova .............. | G10L 15/01 |
| 2018/0270350 | A1 * | 9/2018 | Engelke ................ | G10L 15/01 |
| 2018/0336902 | A1 * | 11/2018 | Cartwright .............. | G06F 16/61 |
| 2019/0079918 | A1 * | 3/2019 | Thörn .................... | G10L 15/05 |

* cited by examiner

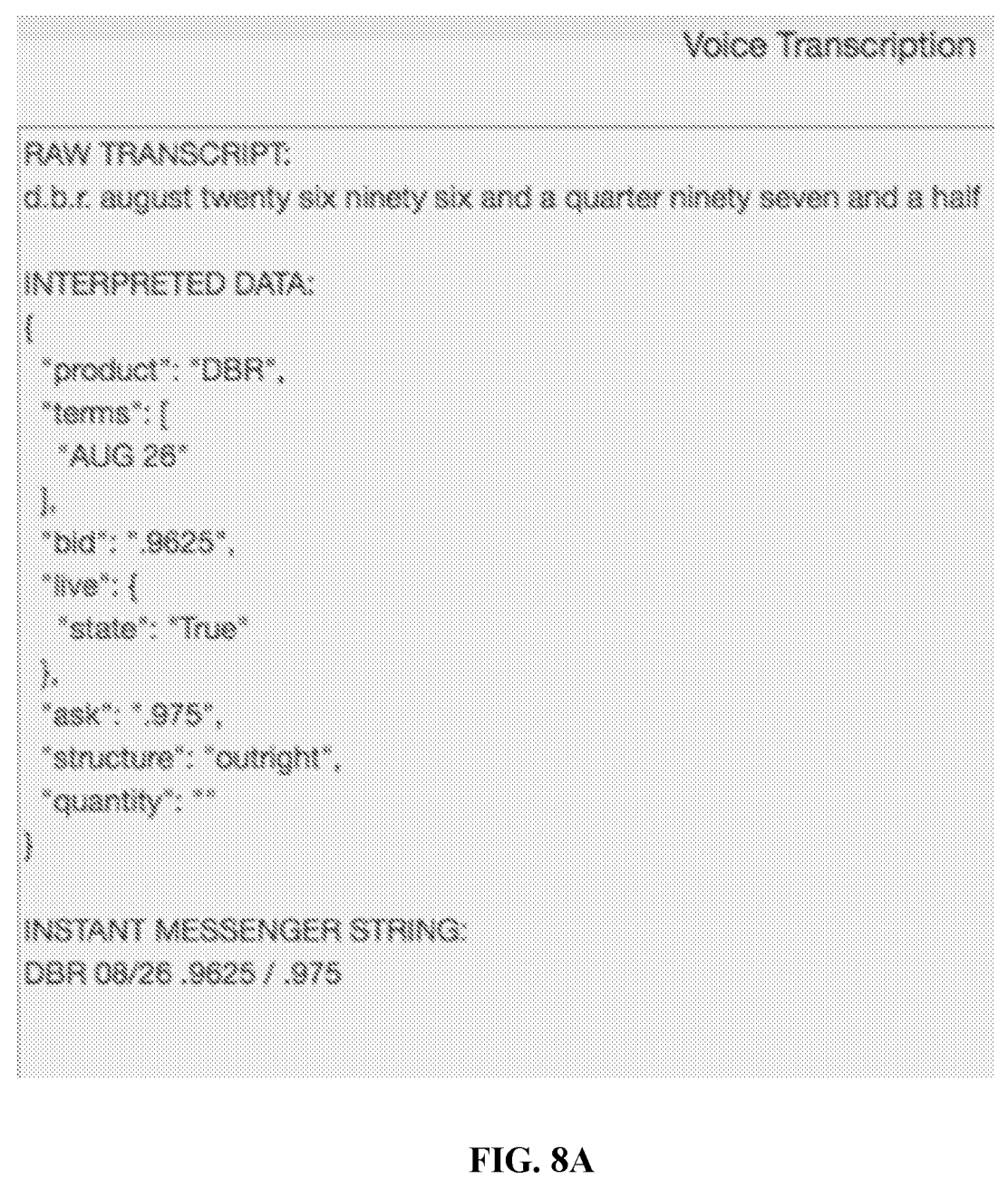

Voice Transcription

RAW TRANSCRIPT:
d.b.r. august twenty six ninety six and a quarter ninety seven and a half INTERPRETED DATA:
{
  "product": "DBR",
  "terms": [
    "AUG 26"
  ],
  "bid": ".9625",
  "live": {
    "state": "True"
  },
  "ask": ".975",
  "structure": "outright",
  "quantity": ""
}

INSTANT MESSENGER STRING:
DBR 08/26 .9625 / .975

FIG. 8A

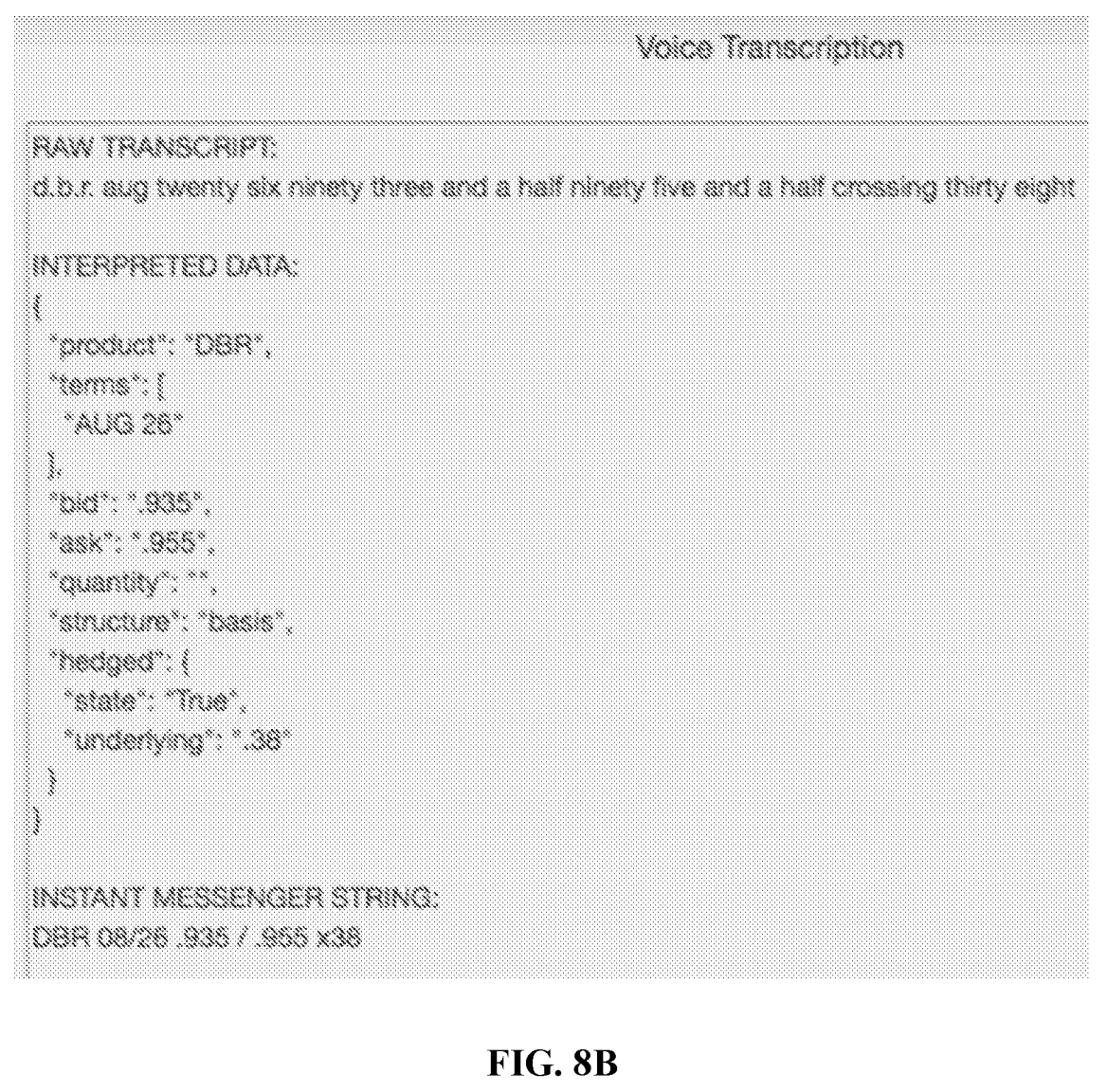

Voice Transcription

RAW TRANSCRIPT:
d.b.r. aug twenty six ninety three and a half ninety five and a half crossing thirty eight INTERPRETED DATA:
{
  "product": "DBR",
  "terms": [
    "AUG 26"
  ],
  "bid": ".935",
  "ask": ".955",
  "quantity": "",
  "structure": "basis",
  "hedged": {
    "state": "True",
    "underlying": ".38"
  }
}

INSTANT MESSENGER STRING:
DBR 08/26 .935 / .955 x38

FIG. 8B

ADAPTIVE SELF-TRAINED COMPUTER ENGINES WITH ASSOCIATED DATABASES AND METHODS OF USE THEREOF

RELATED APPLICATIONS

This application is a continuation of U.S. patent application Ser. No. 15/952,802, filed Apr. 13, 2018, which is a continuation of U.S. patent application Ser. No. 15/682,232, filed Aug. 21, 2017, now abandoned, which is a continuation of U.S. patent application Ser. No. 15/477,909, filed Apr. 3, 2017, now U.S. Pat. No. 9,741,337. The aforementioned applications are incorporated herein by reference in their entirety for all purposes.

FIELD OF THE INVENTION

In some embodiments, the present invention generally relates to adaptive self-trained computer engines which may be utilized, for example, to acquire and process audio speech recordings to generate computer-implemented messages and/or actions based, at least, in part on such processing.

BACKGROUND OF THE INVENTION

Current state of the art machine transcription converts speech to text at a 1-to-1 ratio of audio file length versus transcribing time.

SUMMARY OF THE INVENTION

As used herein, the term "computer engine" identifies at least one software component and/or a combination of at least one software component and at least one hardware component which are designed/programmed/configured to manage/control other software and/or hardware components (such as the libraries, software development kits (SDKs), objects, etc.).

In some embodiments, the present invention provides for an exemplary computer system which includes at least the following components: at least one adaptive self-trained computer engine; at least one multi-core processor including a plurality of cores, where the at least one multi-core processor is associated with the at least one adaptive self-trained computer engine so that the at least one multi-core processor is configured to receive executing instructions from the at least one adaptive self-trained computer engine; where the computer system is configured to perform at least the following operations:

during a training stage:
electronically receiving, by the adaptive self-trained computer engine, an initial speech audio data generated by a microphone of a computing device, where the initial speech audio data corresponds to at least one initial utterance received by the microphone from a particular user where the at least one initial utterance corresponds to an initial text being read by the particular user; dynamically segmenting, by the adaptive self-trained computer engine, the initial speech audio data and the corresponding initial text into a plurality of user phonemes; dynamically querying, by the adaptive self-trained computer engine, at least one database object containing at least one computer dictionary of stored subject-specific phonetic pronunciations of subject-specific words which are related to a particular activity area to match the plurality of user phonemes to a plurality of subject-specific phonetic pronunciations to form a plurality of user-specific subject-specific phonemes; dynamically associating, by the adaptive self-trained computer engine, a plurality of first timestamps with the plurality of user-specific subject-specific phonemes, where each first timestamp corresponds to a time segment location of a respective matched user phoneme in the initial speech audio data so as to form at least one user-specific subject-specific data dictionary of timestamped user-specific subject-specific phonemes; dynamically generating, by the adaptive self-trained computer engine, a plurality of user-specific subject-specific training instructions by utilizing the at least one user-specific subject-specific data dictionary of timestamped user-specific subject-specific phonemes as a user-specific subject-specific speech training model, where each user-specific subject-specific training instruction includes a training text and a synthetized user-specific speech audio of the training text; dynamically outputting, by the adaptive self-trained computer engine, the training text of each user-specific subject-specific training instruction to the computing device; electronically receiving, by the adaptive self-trained computer engine, a training speech audio data generated by the microphone of the computing device, where the training speech audio data corresponds to a training utterance received by the microphone from the particular user where the training utterance corresponds to the training text of each user-specific subject-specific training instruction being read by the particular user; dynamically comparing, by the adaptive self-trained computer engine, the training speech audio data to the synthetized user-specific speech audio of the training text to train the user-specific subject-specific speech training model;

during a transcription stage:
electronically receiving, by the adaptive self-trained computer engine, to-be-transcribed speech audio data of at least one user, where the to-be-transcribed speech audio data corresponds to at least one to-be-transcribed utterance received from the at least one user; dynamically splitting, by the adaptive self-trained computer engine, the to-be transcribed speech audio data into a plurality of to-be-transcribed speech audio segments, where the splitting is at points of silence to form, after each split, two to-be-transcribed speech audio segments with an identical non-silent audio portion; dynamically associating, by the adaptive self-trained computer engine, a plurality of second timestamps with the plurality of to-be-transcribed speech audio segments, where each second timestamp corresponds to a particular time segment location of a respective to-be-transcribed speech audio segment in the to-be-transcribed speech audio data so as to form a plurality of timestamped to-be-transcribed speech audio segments; dynamically assigning, by the adaptive self-trained computer engine, each timestamped to-be-transcribed speech audio segment of the plurality of timestamped to-be-transcribed speech audio segments to a particular core of the plurality of cores of the at least one multi-core processor; dynamically transcribing, in parallel, by the at least one multi-core processor, the plurality of timestamped to-be-transcribed speech audio segments based, at least in part, on the user-specific subject-specific speech training model of the at least one user to generate a plurality of text transcript segments corresponding to the plurality of timestamped to-be-transcribed speech audio segments; where the at least one multi-core processor is configured to dynamically transcribe the plurality of timestamped to-be-transcribed speech audio segments at a transcription rate which is at least n time faster than an average human speech; dynamically assembling, by the adaptive self-trained computer engine, the plurality of text transcript segments into a user-specific subject-specific output transcript of the to-be-transcribed speech audio data, based, at least in part, on the plurality of second timestamps; dynamically verifying, by the adaptive self-trained computer engine, an accuracy of the user-specific subject-specific output transcript of the to-be-transcribed speech audio data to form a verified user-specific subject-specific output transcript of the to-be-transcribed speech audio data; and dynamically and simultaneously applying, by the adaptive self-trained computer engine, a plurality of filters to the verified user-specific subject-specific output transcript to determine at least one subject-specific message of the at least one user in the to-be-transcribed speech audio data, where each filter is a data structure characterizing at least one subject-specific property of at least one particular subject-specific term and at least one context parameter identifying at least one context in which the at least one particular subject-specific term is expected to be used in the particular activity area.

In some embodiments, where the exemplary computer system is further configured to perform at least the following operations: dynamically analyzing, by the adaptive self-trained computer engine, a frequency spectrum of the initial speech audio data, the training speech audio data, or both, to generate a speaker profile of the particular user.

In some embodiments, the analyzing of the frequency spectrum is based, at least in part, on at least one parameter selected from the group consisting of: mean frequency, standard deviation, median, first quartile, third quartile, interquartile range, skewness, kurtosis, spectral entropy, spectral centroid, spectral spread, spectral flux, spectral rolloff, spectral flatness, mode, peak frequency, average and minimum (min) and maximum (max) fundamental frequency, average and min and max dominant frequency, range of dominant frequency, modulation index, zero crossing rate, energy, entropy of energy, Mel frequency cepstral coefficients (MFCCs), chroma vector, and chroma deviation.

In some embodiments, where the computer system is further configured to perform at least the following operations, during the training stage, dynamically storing, by the adaptive self-trained computer engine, the digital speaker profile of the user in a database of digital speaker profiles of a plurality of users.

In some embodiments, the computer system is further configured to perform at least the following operations, during the transcription stage, dynamically analyzing, by the adaptive self-trained computer engine, at least two adjacent to-be-transcribed speech audio segments of the plurality of to-be-transcribed speech audio segments to determine that the at least two adjacent to-be-transcribed speech audio segments comprise utterances received from a plurality of users when at least one first audio feature of at least one first to-be-transcribed speech audio segment of the at least two adjacent to-be-transcribed speech audio segments, which is representative of to-be-transcribed speech audio data of a first user, differs from at least one second audio feature of at least one second to-be-transcribed speech audio segment of the at least two adjacent to-be-transcribed speech audio segments which is representative of to-be-transcribed speech audio data of a second user.

In some embodiments, the computer system is further configured to perform at least the following operations, during the transcription stage, dynamically identifying, by the adaptive self-trained computer engine, the plurality of users based on the database of digital speaker profiles.

In some embodiments, the dynamically verifying the accuracy of the user-specific subject-specific output transcript of the to-be-transcribed speech audio data includes dynamically comparing, by the adaptive self-trained computer engine, phonetically-similar letter pairs of the user-specific subject-specific output transcript of the to-be-transcribed speech audio data to at least one library of subject-specific terms.

In some embodiments, the dynamically verifying the accuracy of the user-specific subject-specific output transcript of the to-be-transcribed speech audio data includes dynamically removing, by the adaptive self-trained computer engine, at least one duplicate instances of words in overlapping text transcript segments In some embodiments, the dynamically and simultaneously applying the plurality of filters to the verified user-specific subject-specific output transcript further includes dynamically evaluating, by the adaptive self-trained computer engine, at least one mistakenly transcribed word as a correctly transcribed word when a pre-determined number of pairs of letters match between the at least one mistakenly transcribed word and at least one subject-specific term of the at least one library of subject-specific terms.

In some embodiments, the particular activity area is an area of financial trading and the at least one context parameter is selected from the group consisting of a number, a time period, a financial trading keyword, and any combinations thereof.

In some embodiments, the at least one library of subject-specific terms is a library of financial trading terms.

In some embodiments, the at least one first audio feature and the at least one second audio feature are based on at least one statistical parameter of the frequency spectrum of the at least two adjacent to-be-transcribed speech audio segments; and where the at least one first audio feature differs from the at least one second audio feature when at least one first value of the at least one statistical parameter of the frequency spectrum of the at least one first to-be-transcribed speech audio segment or at least one second value of the at least one statistical parameter of the frequency spectrum of the at least one second to-be-transcribed speech audio segment exceeds a pre-determined tolerance level.

In some embodiments, the determination of the at least one statistical parameter of the frequency spectrum is based on statistical clustering; and where the at least one statistical parameter is selected from the group consisting of: mean frequency, standard deviation, median, first quartile, third quartile, interquartile range, skewness, kurtosis, spectral entropy, spectral centroid, spectral spread, spectral flux, spectral rolloff, spectral flatness, mode, peak frequency, average and minimum (min) and maximum (max) fundamental frequency, average and min and max dominant frequency, range of dominant frequency, modulation index, zero crossing rate, energy, entropy of energy, Mel frequency cepstral coefficients (MFCCs), chroma vector, and chroma deviation.

In some embodiments, the determination that the at least one first audio feature differ from the at least one second audio feature based on an output of a pre-trained machine classifier model.

In some embodiments, the present invention provides for an exemplary computer-implemented method which includes at least steps of:

during a training stage:

electronically receiving, by an adaptive self-trained computer engine associated with at least one multi-core processor including a plurality of cores, an initial speech audio data generated by a microphone of a computing device, where the initial speech audio data corresponds to at least one initial utterance received by the microphone from a particular user where the at least one initial utterance corresponds to an initial text being read by the particular user; dynamically segmenting, by the adaptive self-trained computer engine, the initial speech audio data and the corresponding initial text into a plurality of user phonemes; dynamically querying, by the adaptive self-trained computer engine, at least one database object containing at least one computer dictionary of stored subject-specific phonetic pronunciations of subject-specific words which are related to a particular activity area to match the plurality of user phonemes to a plurality of subject-specific phonetic pronunciations to form a plurality of user-specific subject-specific phonemes; dynamically associating, by the adaptive self-trained computer engine, a plurality of first timestamps with the plurality of user-specific subject-specific phonemes, where each first timestamp corresponds to a time segment location of a respective matched user phoneme in the initial speech audio data so as to form at least one user-specific subject-specific data dictionary of timestamped user-specific subject-specific phonemes; dynamically generating, by the adaptive self-trained computer engine, a plurality of user-specific subject-specific training instructions by utilizing the at least one user-specific subject-specific data dictionary of timestamped user-specific subject-specific phonemes as a user-specific subject-specific speech training model, where each user-specific subject-specific training instruction includes a training text and a synthetized user-specific speech audio of the training text; dynamically outputting, by the adaptive self-trained computer engine, the training text of each user-specific subject-specific training instruction to the computing device; electronically receiving, by the adaptive self-trained computer engine, a training speech audio data generated by the microphone of the computing device, where the training speech audio data corresponds to a training utterance received by the microphone from the particular user where the training utterance corresponds to the training text of each user-specific subject-specific training instruction being read by the particular user; dynamically comparing, by the adaptive self-trained computer engine, the training speech audio data to the synthetized user-specific speech audio of the training text to train the user-specific subject-specific speech training model;

during a transcription stage:

electronically receiving, by the adaptive self-trained computer engine, to-be-transcribed speech audio data of at least one user, where the to-be-transcribed speech audio data corresponds to at least one to-be-transcribed utterance received from the at least one user; dynamically splitting, by the adaptive self-trained computer engine, the to-be transcribed speech audio data into a plurality of to-be-transcribed speech audio segments, where the splitting is at points of silence to form, after each split, two to-be-transcribed speech audio segments with an identical non-silent audio portion; dynamically associating, by the adaptive self-trained computer engine, a plurality of second timestamps with the plurality of to-be-transcribed speech audio segments, where each second timestamp corresponds to a particular time segment location of a respective to-be-transcribed speech audio segment in the to-be-transcribed speech audio data so as to form a plurality of timestamped to-be-transcribed speech audio segments; dynamically assigning, by the adaptive self-trained computer engine, each timestamped to-be-transcribed speech audio segment of the plurality of timestamped to-be-transcribed speech audio segments to a particular core of the plurality of cores of the at least one processor; dynamically transcribing, in parallel, by the at least one multi-core processor, the plurality of timestamped to-be-transcribed speech audio segments based, at least in part, on the user-specific subject-specific speech training model of the at least one user to generate a plurality of text transcript segments corresponding to the plurality of timestamped to-be-transcribed speech audio segments; where the adaptive self-trained computer engine is configured to dynamically transcribe the plurality of timestamped to-be-transcribed speech audio segments at a transcription rate which is at least n time faster than an average human speech; dynamically assembling, by the adaptive self-trained computer engine, the plurality of text transcript segments into a user-specific subject-specific output transcript of the to-be-transcribed speech audio data, based, at least in part, on the plurality of second timestamps; dynamically verifying, by the adaptive self-trained computer engine, an accuracy of the user-specific subject-specific output transcript of the to-be-transcribed speech audio data to form a verified user-specific subject-specific output transcript of the to-be-transcribed speech audio data; and dynamically and simultaneously applying, by the adaptive self-trained computer engine, a plurality of filters to the verified user-specific subject-specific output transcript to determine at least one subject-specific message of the at least one user in the to-be-transcribed speech audio data, where each filter is a data structure characterizing at least one subject-specific property of at least one particular subject-specific term and at least one context parameter identifying at least one context in which the at least one particular subject-specific term is expected to be used in the particular activity area.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

FIGS. 1-8B show some exemplary aspects of the present invention depicted in accordance with at least some principles of at least some embodiments of the present invention.

DETAILED DESCRIPTION OF THE INVENTION

Figure 1:
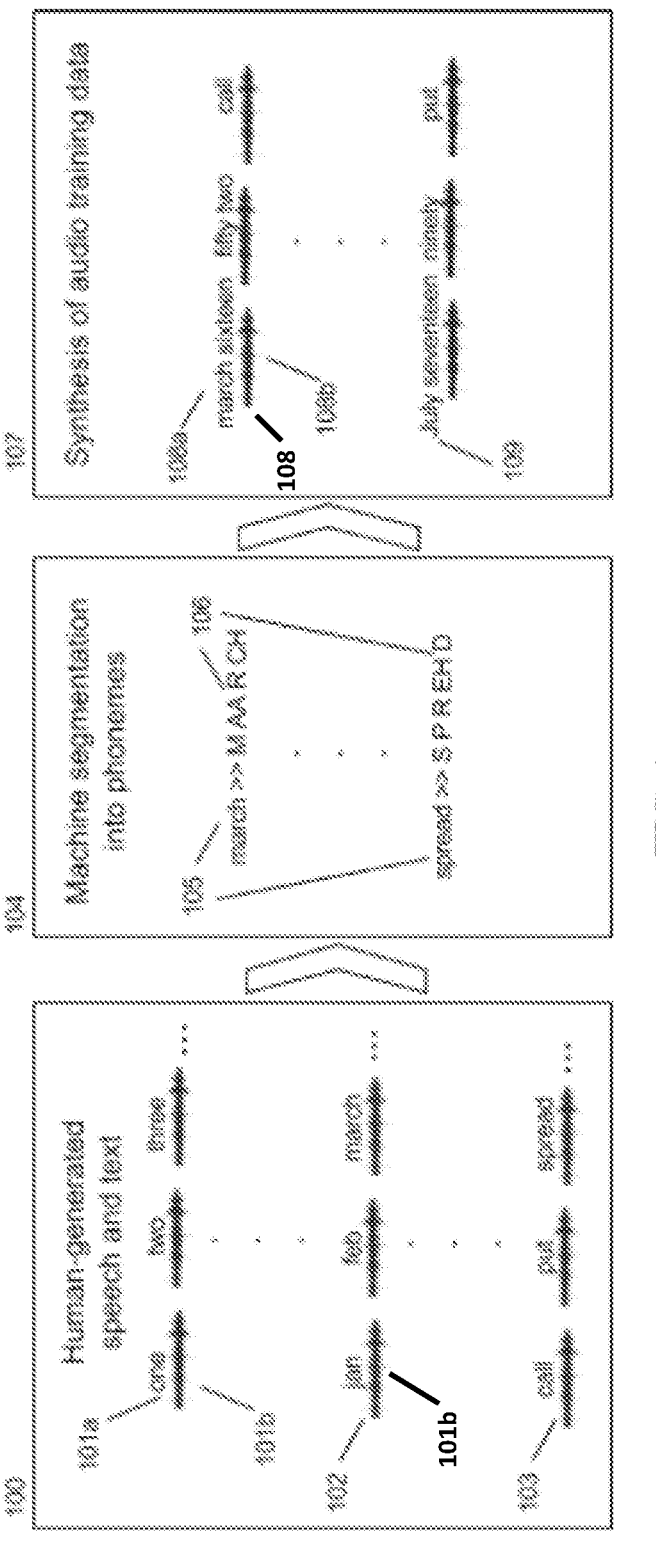

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred (e.g., less than 1 second difference between sequential events/actions).

As used herein, the term "dynamic(ly)" means that events and/or actions can be triggered and/or occur without any human intervention.

As used herein, the term "computer engine" identifies at least one software component and/or a combination of at least one software component and at least one hardware component which are designed/programmed/configured to manage/control other software and/or hardware components (such as the libraries, software development kits (SDKs), objects, etc.).

In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, etc.

In some embodiments, the inventive adaptive self-trained computer engines with associated devices may be configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Basic, AJAX, Javascript). The aforementioned examples are, of course, illustrative and not restrictive.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

In one example implementation, a multi-processor system may include a plurality of processor chips each of which includes at least one I/O component which is designed to directly connect to photonic components. Each or at least one of the processor chips may be liquid cooled. In some embodiments, the multi-processor system may further include a cooling mechanism and a liquid coolant contained in the cooling mechanism. The liquid coolant may be in direct contact with a back side of a processor die of at least one of the processor chips. In some embodiments, the liquid coolant may change phase to a vapor as part of a heat transfer process. In some embodiments, the vaporized liquid coolant may be condensed by a heat exchanger of the cooling mechanism containing a secondary fluid. In some embodiments, the secondary fluid may be of a different type than the liquid coolant. In some embodiments, a heat flux from the processor die of at least one of the processor chips may be enhanced by impingement. For instance, the liquid coolant may be impinged on the back side of a processor die of at least one of the processor chips.

In one example implementation, a multi-processor system may include a plurality of photonic components and a plurality of processor chips each of which includes at least one I/O component which is designed to directly connect to the photonic components. Each of the processor chips may also include a voltage regulation circuit configured to regulate a voltage of one or more of the processor chips. In some embodiments, the voltage regulation circuit of each of the processor chips may provide one or more voltage domains of the respective processor chip. In some embodiments, the multi-processor system may further include one or more additional electronic components, e.g., inductors, as part of the package.

In one example implementation, a multi-processor system may include a plurality of processor chips each of which includes at least one I/O component which is designed to directly connect to photonic components. The processor chips may be packaged so a total latency from any one of the processor chips to data at any global memory location may not be dominated by a round trip speed-of-light propagation delay. In some embodiments, the multi-processor system may include at least 10,000 processor chips and may be packaged into a total volume of no more than 8 m3. In some embodiments, a density of the processor chips may be greater than 1,000 chips per cubic meter. In some embodiments, a latency of the multi-processor system, having more than 1,000 processor chips, may be less than 200 nanoseconds (ns).

In one example implementation, a multi-processor system may include an inter-processor interconnect (IPI) and a plurality of processor chips. The processor chips are configured to communicate data to one another through the IPI. Each of the processor chips may include one or more cores and one or more level 1 (L1) caches. Each of the L1 caches may be associated with a respective core through a respective core-cache bandwidth. Each of the processor chips may also include at least one memory controller and one or more local memory devices. Each of the local memory devices may be associated with the at least one memory controller through a respective local memory bandwidth. Each of the processor chips may further include an on-chip interconnect (OCI) that is associated with the one or more cores and the at least one memory controller of that processor chip. The OCI is also associated with the IPI of the multi-processor system. The association between the OCI and the plurality of cores of that processor chip is through a bandwidth that is greater than 50% of an aggregate core bandwidth, which is approximately the sum of each core-cache bandwidth of that processor chip. The association between the OCI and the at least one memory controller of that processor chip is through a bandwidth that is greater than 50% of an aggregate memory bandwidth, which is approximately the sum of each local memory bandwidth of that processor chip. The association between the OCI and the IPI of the multi-processor system is through an injection bandwidth. In some embodiment, the injection bandwidth is greater than 50% of the aggregate core bandwidth of that processor chip. In some embodiment, the injection bandwidth is greater than 50% of a sum of the aggregate core bandwidth and the aggregate memory bandwidth of that processor chip.

In some embodiments, the inventive adaptive self-trained computer engines with associated devices may be programmed/configured to acquire and/or process audible speech recordings from a plurality of users which may be, but is not limited to, at least 100 (e.g., but not limited to, 100-999), at least 1,000 (e.g., but not limited to, 1,000-9,999), at least 10,000 (e.g., but not limited to, 10,000-99, 999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, an exemplary inventive adaptive self-trained computer engine with associated device(s) (e.g., database(s)) is configured/programmed to generate datasets of training data from samples of human-generated speech and associated text to self-train the exemplary inventive adaptive self-trained computer engine for computer-implemented to generate, from data representative of electronically acquired human speech (e.g., real-time processing), electronic messages and/or actions such as, but not limited to, messages and/or actions related to execution of financial transactions (e.g., trading of financial assets (e.g., stock, currency, bitcoin, physical and/or virtual commodities, etc.).

In some embodiments, the exemplary inventive adaptive self-trained computer engine is configured/programmed to be trained during an iterative learning process when a user voices a set of representative number of words related to financial trades. In some embodiments, the exemplary inventive adaptive self-trained computer engine is configured/programmed to record and store the user's speech into a least one audio file or database entry. In some embodiments, as part of the self-trained, the exemplary inventive adaptive self-trained computer engine is configured/programmed to use the data to synthesize speech based on the user's speech pattern.

In some embodiments, the exemplary inventive adaptive self-trained computer engine is configured/programmed to utilize audio files representative of various combinations of, for example, financial trades within the domain of numbers and typical trade keywords as training data. In some embodiments, the exemplary inventive adaptive self-trained computer engine is configured/programmed to utilize the audio files for training by determining at least one speaker identity signature of a particular user based, at least in part, on the frequency spectrum of the voice samples recoded in the audio files.

In some embodiments, the exemplary inventive adaptive self-trained computer engine is configured/programmed to split an exemplary audio file (e.g., recording of one or more trading instructions) of one or more exemplary users (e.g., one or more traders) into numerous overlapping parts based, at least in part, on, for example but not limited to, points of silence within the file and/or points in the file where one or more particular audio features mathematically diverges, indicating a change in the audio stream from one speaker to another. In some embodiments, the audio features may be such as, but not limited to, mean frequency, standard deviation, median, first quartile, third quartile, interquartile range, skewness, kurtosis, spectral entropy, spectral centroid, spectral spread, spectral flux, spectral rolloff, spectral flatness, mode, peak frequency, average and minimum (min) and maximum (max) fundamental frequency, average and min and max dominant frequency, range of dominant frequency, modulation index, zero crossing rate, energy, entropy of energy, Mel frequency cepstral coefficients (MFCCs), chroma vector, chroma deviation, and any combination thereof.

In some embodiments, the exemplary inventive adaptive self-trained computer engine is configured/programmed to decode parts in parallel by streaming at a sufficiently accelerated sampling rate (e.g., from 16,000 bytes/second to 128,000 bytes/second; from 10,000 bytes/second to 150,000 bytes/second; from 10,000 bytes/second to 200,000 bytes/second, etc.) and, then, combine the decoded parts to obtain the resulting speech-to-text conversion output. In some embodiments, the exemplary inventive adaptive self-trained computer engine is configured/programmed to match the frequency spectra of the segmented audio files to a library of speaker identity signatures to identify the speaker in each segmented audio file, and to generate and associate speaker identity metadata with the resulting output (e.g., transcript).

In some embodiments, as detailed herein, the exemplary inventive adaptive self-trained computer engine is configured/programmed to train itself a training data set that may be acquired in an exemplary manner described in FIG. 1. For example, as shown in the exemplary process flowchart 100, the exemplary inventive adaptive self-trained computer engine is configured/programmed to obtain speech audio recording(s) 101*b* of a user and the corresponding text 101*a*. In some embodiments, the content of the text may be such, but not limited to, that it may cover typical essential words in a particular activity area such as, but not limited to, financial trading. For example, in the area of financial trading, the context of the text may include, but not limited to, numbers 101*a*, months 102, financial keywords 103, and any combinations thereof.

In some embodiments, as detailed herein, the exemplary inventive adaptive self-trained computer engine is configured/programmed to segment the audio and text inputs into phonemes at step 104, where words 105 in the text transcript, being read by the user during a training stage, and dynamically cross-reference each phoneme with an exemplary dictionary containing the phonetic pronunciations 106 which are relevant to the particular activity area (i.e., subject-specific) such as, but not limited to, financial trading. In some embodiments, as detailed herein, the exemplary inventive adaptive self-trained computer engine is configured/programmed to then assign each matched phoneme (106) to a particular time segment in the audio file 101*b* from which such phoneme is located, generating a database collection (data dictionary) of timestamped phonemes. In some embodiments, as detailed herein, the exemplary inventive adaptive self-trained computer engine is configured/programmed to then utilize the database collection of time-stamped phonemes as a speech training synthesis model to dynamically synthesize many possible combinations of training instructions at step 107 where each training instruction includes textual component 108*a* and audio component 108*b*. For example, exemplary training instructions may include financial trades 108 and 109. In some embodiment, the exemplary inventive adaptive self-trained computer engine is configured/programmed to continue the training until the number of errors (measured, for example, as a sum of a number of incorrect words, deleted words, and inserted words divided by a total number of words) in a transcription of an independent testing data set which includes the text and audio is minimized such that further training fails to reduce or even increases the number of errors.

In some embodiments, as detailed herein, the exemplary inventive adaptive self-trained computer engine is configured/programmed to analyze the frequency spectrum of the audio obtained in step 100 to create a speaker signature of a particular human speaker who has generated the audio recording. For example, to determine the speaker signature of the particular speaker/user, the exemplary inventive adaptive self-trained computer engine is configured/programmed to analyze the frequency spectrum based on one or more parameters such as, but not limited to, mean frequency, standard deviation, median, first quartile, third quartile, interquartile range, skewness, kurtosis, spectral entropy, spectral centroid, spectral spread, spectral flux, spectral rolloff, spectral flatness, mode, peak frequency, average and minimum (min) and maximum (max) fundamental frequency, average and min and max dominant frequency, range of dominant frequency, modulation index, zero crossing rate, energy, entropy of energy, Mel frequency cepstral coefficients (MFCCs), chroma vector, chroma deviation and any combination thereof. In some embodiments, as detailed herein, the exemplary inventive adaptive self-trained computer engine is configured/programmed to store in a database the speaker signature (a "fingerprint") to be use in speaker/user identification during the analysis of audio recordings (decoding).

In some embodiments, the exemplary inventive adaptive self-trained computer engine is trained, as detailed herein, using at least one dynamic speech recognition model which may be based, at least in part, on, but not limited to, a suitable Gaussian mixture model, a suitable hidden Markov model, a suitable machine learning models trained via a neural network, or a combination of these or other similarly suitable models.

Figure 2:
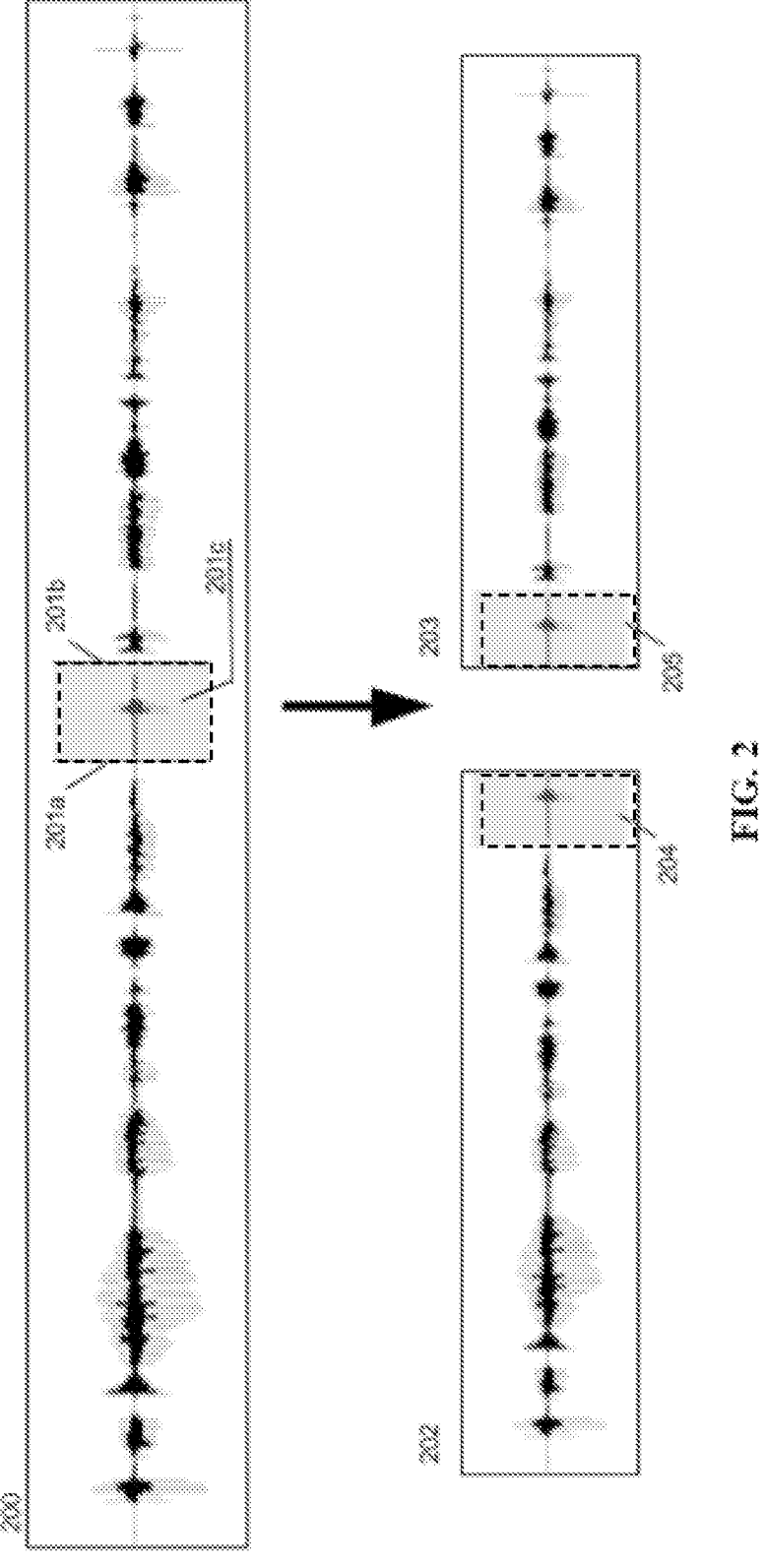

In some embodiments, as detailed herein, the exemplary inventive adaptive self-trained computer engine is configured/programmed to split audio files at points of silence such that an identical non-silent audio portion exists in both split parts to ensure the parts overlap as described, in an exemplary manner, in FIG. 2. For example, the exemplary inventive adaptive self-trained computer engine is configured/programmed to process an audio file 200 to identify regions of silence (e.g., regions 201*a* and 201*b*) and, furthermore, to identify, among all regions of silence, particular regions of silence that separate segments of audio with divergent collections of audio features which have been likely spoken by two separate individual speakers. The exemplary inventive adaptive self-trained computer engine is configured/programmed to split the audio file 200 into two segments 202 and 203 such that a silence region 201*c* between the start and end points 201*a* and 201*b* is represented at the end of the first segment 202 as a first silence region 204 and at the beginning of the second segment 203 as a second silence region 205.

In some embodiments, as detailed herein, the exemplary inventive adaptive self-trained computer engine is configured/programmed to further analyze each segment (e.g., 202, 203) for potential speaker boundaries. For example, the exemplary inventive adaptive self-trained computer engine is configured/programmed to analyze the statistical parameters of the frequency spectrum between two adjacent audio segments. If, for example, the parameters of the two segments are within a pre-determined tolerance level (e.g., 1%, 2%, 3%, 4%, 5%, . . . 10%, etc.), the audio segments are identified as originating from the same speaker. If the parameters are outside of the pre-determined tolerance level, the second audio segment is identified as containing a speaker change. Note that the method of determining a speaker change is not limited to the above mentioned tolerance level of parameters. In some embodiments, the exemplary inventive adaptive self-trained computer engine is configured/programmed to analyze the statistical parameters of the frequency spectrum between two adjacent audio segments and to use the parameters in a pre-trained machine classifier model to predict a speaker change. If the audio segments contain a speaker change, then the exemplary inventive adaptive self-trained computer engine is configured/programmed to process the "speaker change" segment to further segment in to smaller subsegments, and then determine and analyze statistical parameters of the frequency spectrum of these subsegments to identify speakers. In some embodiments, as detailed herein, the exemplary inventive adaptive self-trained computer engine is configured/programmed to repeat the above identified segmentation-speaker recognition processing a sufficient number of times to provide sufficient accuracy of speaker-separated speech. In some embodiments, further processing, for example, statistical clustering, may be used on the parameters of the speaker subsegments to improve accuracy of speaker-separated speech. In some embodiments, as the exemplary inventive adaptive self-trained computer engine has generated a data library of single-speaker segments and associated these segments with corresponding identity(ies) of speaker(s), the exemplary inventive adaptive self-trained computer is configured/programmed to separate subsegments of different speakers by utilizing, at least in part, a comparison of the frequency spectrum parameters of each segment to "fingerprint(s)" of each speaker.

In some embodiments, the exemplary inventive adaptive self-trained computer is configured/programmed to separate subsegments of different speakers by utilizing a pre-trained machine classifier model. In some embodiments, an exemplary pre-trained machine classifier model may be constructed based, at least in part, on a training dataset which may contain audio labeled segments which may be labeled with "0" where there is no speaker change ("0" labels) and segments labeled with "1" where there is a speaker change ("1" labels). Then, the learning or training phase may represent an exemplary iterative process which is configured to minimize convex functions over convex sets based on the audio feature set as a numerical representation of the segments. In some embodiments, the exemplary inventive adaptive self-trained computer engine is configured/programmed to utilize this exemplary trained model to predict speaker changes at segment boundaries for the decision of whether or not to split the audio input in particular segments.

In some embodiments, as detailed herein, the exemplary inventive adaptive self-trained computer engine is configured/programmed to generate a speaker profile based on the frequency spectrum of the voice samples, and then utilize the speaker profile to dynamically identify speakers. In some embodiments, as detailed herein, the exemplary inventive adaptive self-trained computer engine is configured/programmed to add the identified speakers to metadata of a final transcript described herein.

Figure 3:
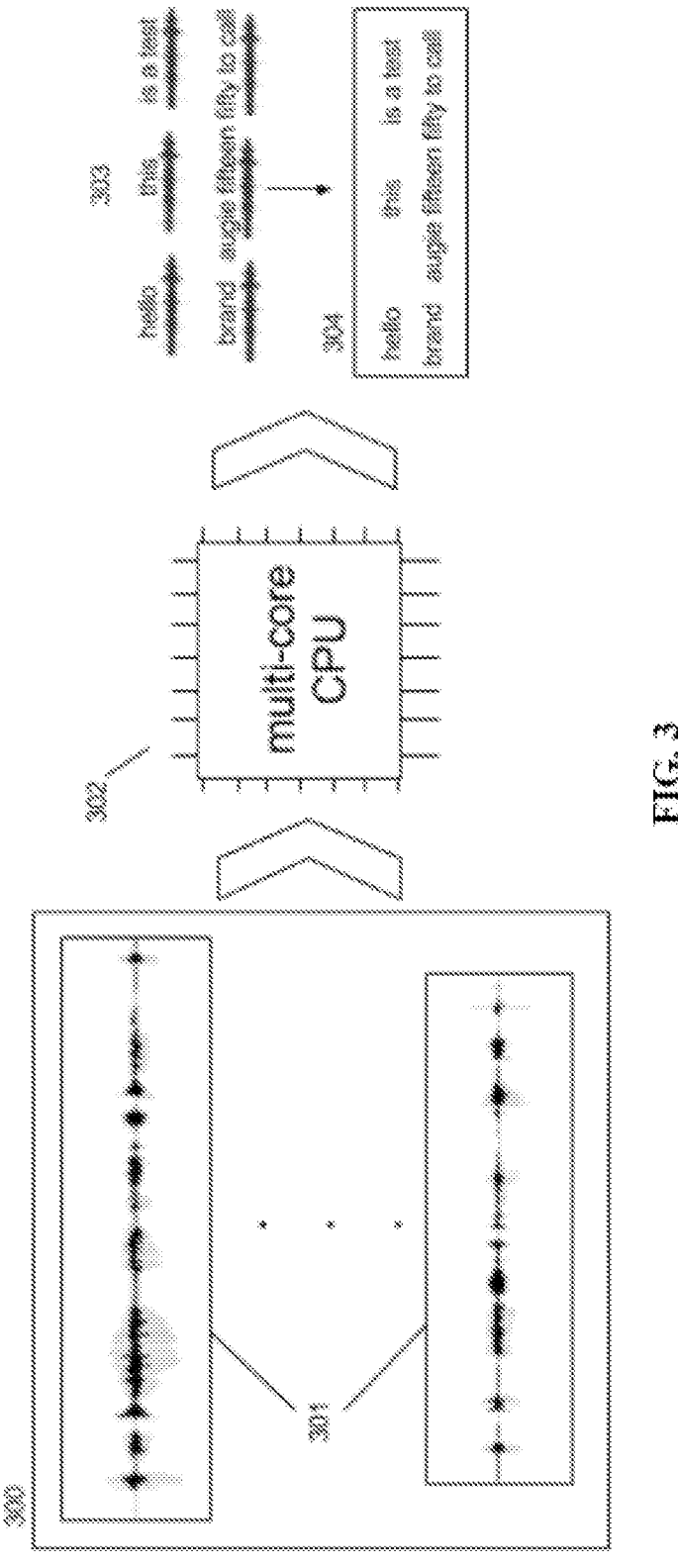

For example, as shown in FIG. 3, in some embodiments, the exemplary inventive adaptive self-trained computer engine is configured/programmed to utilize one or more multi-core central processing unit 302 to process a collection of audio file segments 300 in parallel to obtain a complete text transcript. For example, in some embodiments, the exemplary inventive adaptive self-trained computer engine is configured/programmed to assign a specific core on the exemplary CPU to stream each segment 301. For example, each processor chip utilized by the exemplary inventive adaptive self-trained computer engine contains multiple processing elements, or cores, has links to other processor chips, and has links to one or more memory chips. In some embodiments, for example, if the number of segments is greater than the number of cores on the CPU, the processing jobs are queued until a next core becomes available.

Once all segments have been processed, the output may be a collection of segmented audio and the corresponding text 303. For example, in some embodiments, the exemplary inventive adaptive self-trained computer engine is configured/programmed to process the text 303 to put the segmented text together and concatenate to form an output transcript 304 (e.g., a trading instruction, trading transcript, etc.) based, at least in part, on timestamps.

Figure 4:
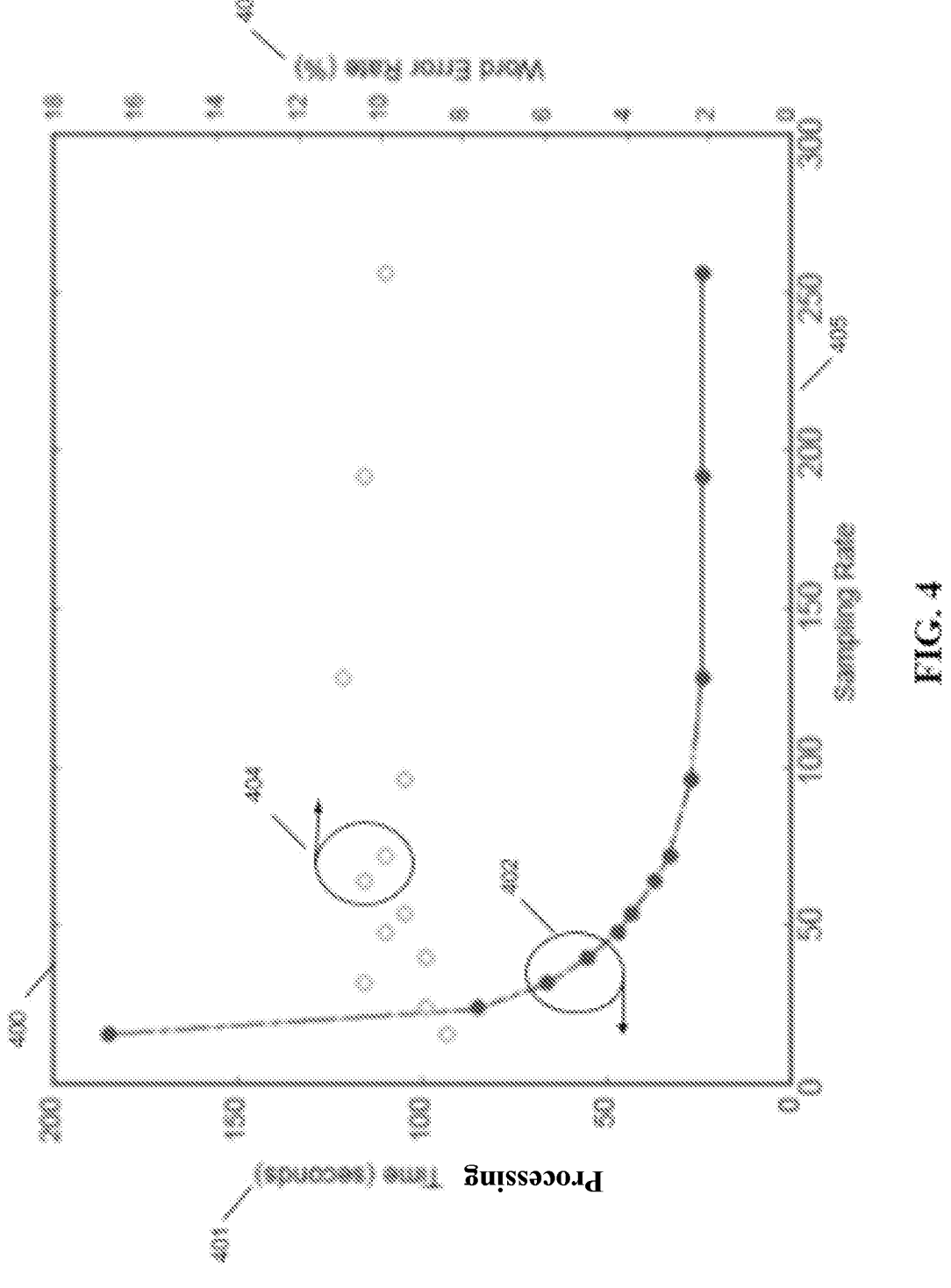

For example, as shown in FIG. 3, in some embodiments, the exemplary inventive adaptive self-trained computer engine is configured/programmed to increase the processing speed by increasing the bitrate and/or sampling rate of a particular audio file. For example, FIG. 4 shows a chart of the decoding time and transcription accuracy as a function of the accelerated bitrate, wherein the accuracy is maintained while the decoding time is significantly reduced. For example, the exemplary inventive adaptive self-trained computer engine is configured/programmed to split an audio file into N number of overlapping chunks and then sends to N number of cores that "listens" to the audio chunks at a rate of, for example but not limited to, X times faster than an average human speech, where X may be between 5 and 20 (e.g., 16). For instance, at X equals to 16, the exemplary inventive adaptive self-trained computer engine may split an exemplary audio file of 100 hours into 1000 six minute chunks across 1000 cores so that the total time to transcribe 100 hours of audio is only six minutes.

FIG. 4 shows the relationship between the processing time and accuracy as a function of sampling rate 400. For example, the time it takes for a single core of a CPU to process an audio file is shown on the left y-axis 401 and the dark circles 402 as a function of the sampling rate 405. For example, the accuracy of the process text presented as the word error rate (e.g., the accuracy may be calculated as a sum of the inserted, deleted, and substituted words divided by the total number of words) is shown on the right y-axis 403 and the light circles 404 as a function of the sampling rate 405. For example, in some embodiments, a lower word error rate may correspond to a higher accuracy. For example, the exemplary graph of FIG. 4 shows that the processing time may be decreased significantly by increasing the sampling rate, while the accuracy would not significantly change. In some embodiments, the streaming of the audio to the CPU core by the exemplary inventive adaptive self-trained computer engine can occur at a duration which is significantly less than the actual length of the audio (e.g., five times less, ten times less, etc.).

Figure 5:
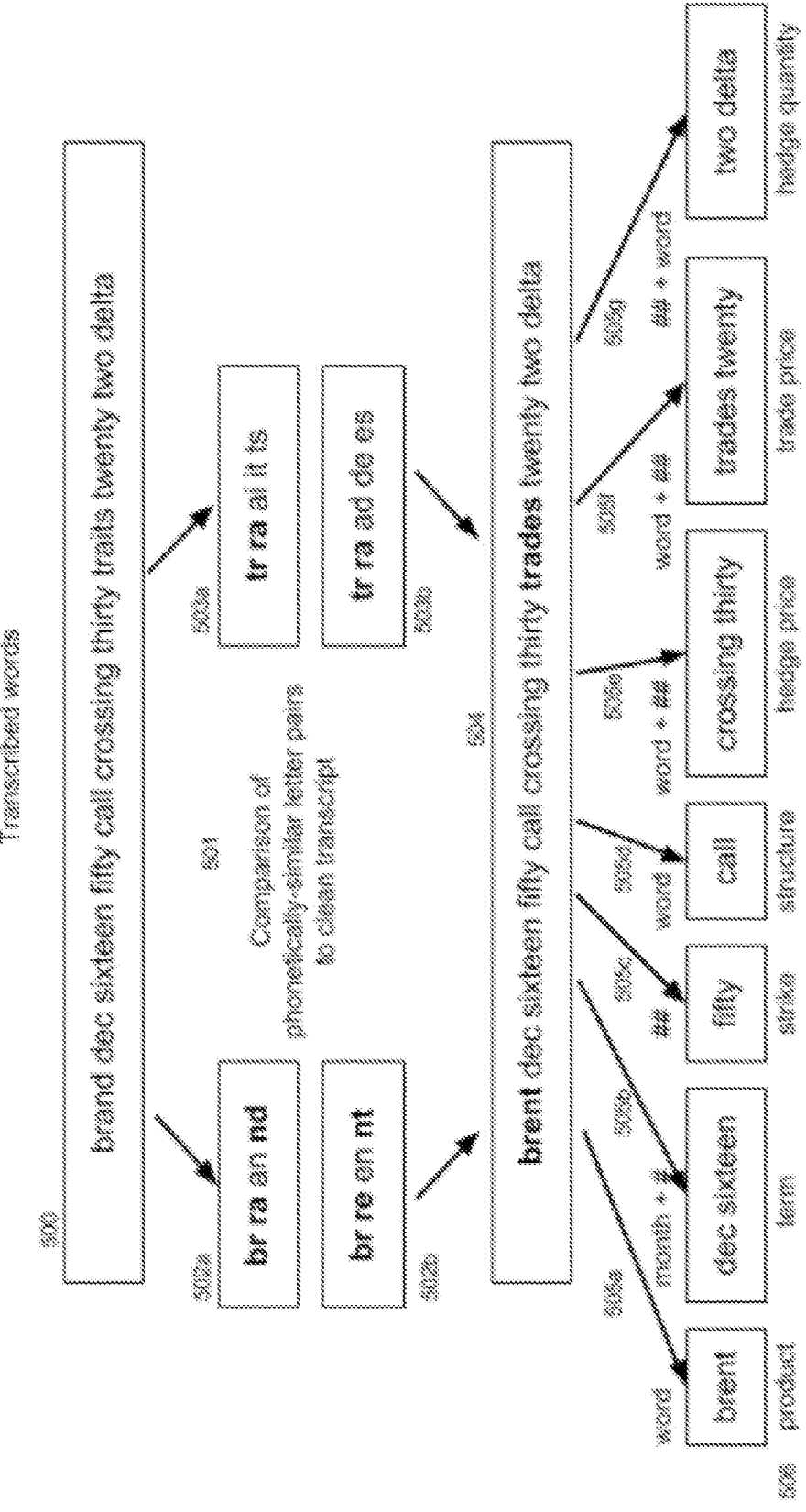

FIG. 5 shows a diagram of an exemplary processing performed by the exemplary inventive adaptive self-trained computer engine is configured/programmed to interpret financial trades from the transcribed text on accordance to some embodiments of the present invention. In some embodiments, the exemplary inventive adaptive self-trained computer engine is configured/programmed to correct transcription errors by comparing keywords with similar letter pairs and applying one or more filters to the text output to extract all trade properties. For example, once the exemplary inventive adaptive self-trained computer engine has generated the text transcript, the exemplary inventive adaptive self-trained computer engine is configured/programmed to then analyze the text transcript 500, as described in FIG. 5, to extract potential financial trades from the text. In some embodiments, to increase the accuracy of detection of trades from the text transcript 500, the exemplary inventive adaptive self-trained computer engine is configured/programmed to perform the interpretation in at least two steps. First, the exemplary inventive adaptive self-trained computer engine is configured/programmed to verify the accuracy of transcription by comparing phonetically-similar letter pairs 501 between the transcribed words and a library of financial terms/keywords. For example, the word "brand" 502a can be identified as the word "brent" 502*b* because of three phonetically-similar letter pairs. In another example, the word "traits" 503*a* can be identified as the word "trades" 503*b* by the exact match of two letter pairs. In similar manner, the exemplary inventive adaptive self-trained computer engine is configured/programmed to correct errors in the exemplary speech recognition model to generate a clean (verified) transcript 504.

In some embodiments, the exemplary inventive adaptive self-trained computer engine is configured/programmed to further process, simultaneously, words of the clean transcript 504 through a series of filters 505 to identify the part of the trade that the words relate to in trade dictionary of a particular type of trade 506 (e.g., customary words/terms used in trading crude oil). For example, the "term" property of a particular trade is a month followed by a number in as shown in applying a filter 505*b*. In the case of the exemplary transcript 504, the exemplary inventive adaptive self-trained computer engine is configured/programmed to simultaneously apply a plurality of filters to identify relevant patterns, such as, but not limited to, applying: 1) a filter 505*f* for word(s) related to the "trade price" to identify word(s) representative of (or associated with) the "trade price" which is/are followed by a value for the trade price, resulting in the interpretation of the trade price of "trades twenty;" and 2) a filter 505*g* for word(s) related to the "hedge quantity" to identify a number followed by word(s) representative of (or associated with) the "hedge quantity," resulting in the interpretation of the hedge quantity of "two delta." In contrast, if the exemplary inventive adaptive self-trained computer engine is not configured/programmed to applying the filter 505*f* and filter 505*g* together simultaneously to look for these two patterns (e.g., a filter that looks for the trade price but not the hedge quantity), the outcome could misinterpret the trade price as "trades twenty two."

In some embodiments, the exemplary inventive adaptive self-trained computer engine is configured/programmed to remove the duplicate instances of words in the overlapping transcribed text section(s) of the combined transcript to generate a final transcript. In some embodiments, the exemplary inventive adaptive self-trained computer engine is configured/programmed to evaluate mistakenly transcribed words as correctly transcribed financial words if a certain number (X) pairs of letters match between the two words. In some embodiments, the value of X may be determined as a number of letter pairs in the word to be matched divided by two and rounded down to the nearest integer, or the value 2, whichever is greater. In some embodiments, if no match has been identified, the exemplary inventive adaptive self-trained computer engine is configured/programmed to optionally repeat the comparing process by comparing letter pairs while neglecting the vowels in each word.

In some embodiments, in case of the financial trading, the exemplary inventive adaptive self-trained computer engine is configured/programmed to train itself based on a library of standard data structures configured to describe certain key aspects of a particular professional area. For example, the exemplary inventive adaptive self-trained computer engine is configured/programmed to train itself based on a library of standard data structures configured to describe at least one of types of trades, financial instruments, and financial assets. For example, the exemplary inventive adaptive self-trained computer engine is configured/programmed to train itself based on the entirety of number words and financial keywords. In some embodiments, the exemplary inventive adaptive self-trained computer engine is then configured/programmed to analyze combinations of words and numbers together to correctly identify, for example but not limited to, part(s) of a financial trade to generate a trade ticket/quote. For example, the exemplary inventive adaptive self-trained computer engine is then configured/programmed to compare numbers, which represent prices, are compared to a database of possible prices and are corrected if particular number(s) is/are outside of a particular range.

In some embodiments, the exemplary inventive adaptive self-trained computer engine is configured/programmed to store samples of text containing the corrected words from mistakenly transcribed words and their corresponding audio as the training data in one or more suitable data structures.

In some embodiments, the exemplary inventive adaptive self-trained computer engine is configured/programmed to dynamically store the final transcript in at least one database. In some embodiments, the exemplary inventive adaptive self-trained computer engine is configured/programmed to analyze the final transcript to extract individual trade(s) belonging to certain asset class(es).

In some embodiments, the exemplary inventive adaptive self-trained computer engine is configured/programmed to analyze the final transcript to identify instances of trading violations. In some embodiments, the exemplary inventive adaptive self-trained computer engine is configured/programmed to analyze the final transcript to calculate associated fees (e.g., commission fees, execution fees, etc.) In some embodiments, the exemplary inventive adaptive self-trained computer engine is configured/programmed to analyze the final transcript to identify any information that is subject to regulatory disclosure requirement(s) of a particular regulatory agency (e.g., Securities and Exchange Committee (SEC)).

Figure 6A:
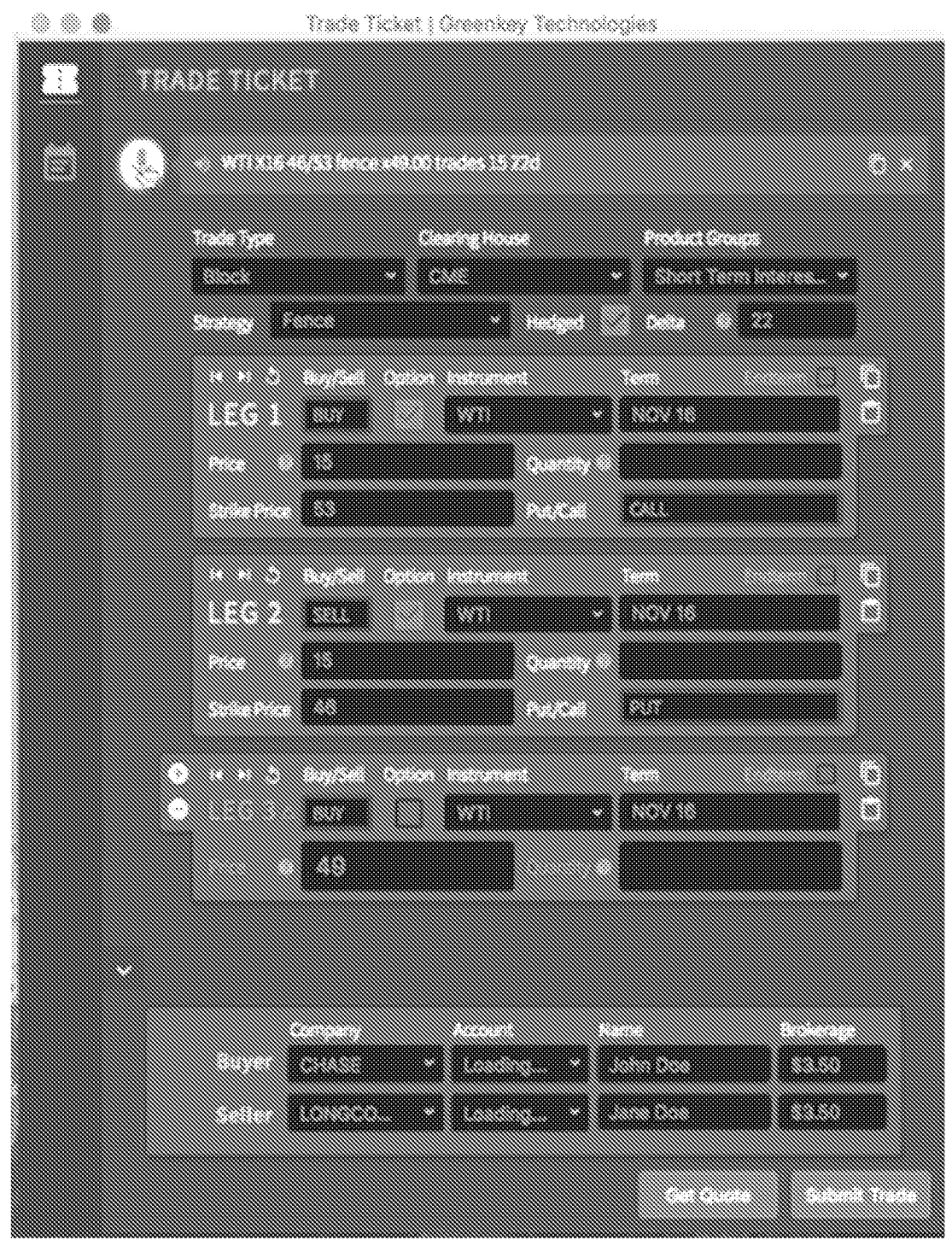

FIG. 6A shows a snapshot of an exemplary inventive interface that is programmed/configured to be utilized by the exemplary inventive adaptive self-trained computer engine during the training. For example, via the exemplary inventive interface, the exemplary inventive adaptive self-trained computer engine may ask the user (e.g., a trader) to read aloud certain text that may include words and/or numbers. As the user reads the exemplary text shown in FIG. 6A, the exemplary inventive interface the exemplary inventive adaptive self-trained computer engine, in real-time, acquires and processes the user's voice recording in accordance with at least some inventive principles describe herein, and dynamically fills, in real-time, information in a training trading ticket.

Figure 6B:

FIG. 6B shows a snapshot of the exemplary inventive interface which displays an exemplary text message "correct price twenty" generated by the exemplary inventive adaptive self-trained computer engine. As the user reads the exemplary text shown in FIG. 6B, the exemplary inventive adaptive self-trained computer engine, in real-time, acquires and processes the user's voice recording in accordance with at least some inventive principles describe herein, and dynamically corrects the "price" entry from "15" to "20."

Figure 7A:
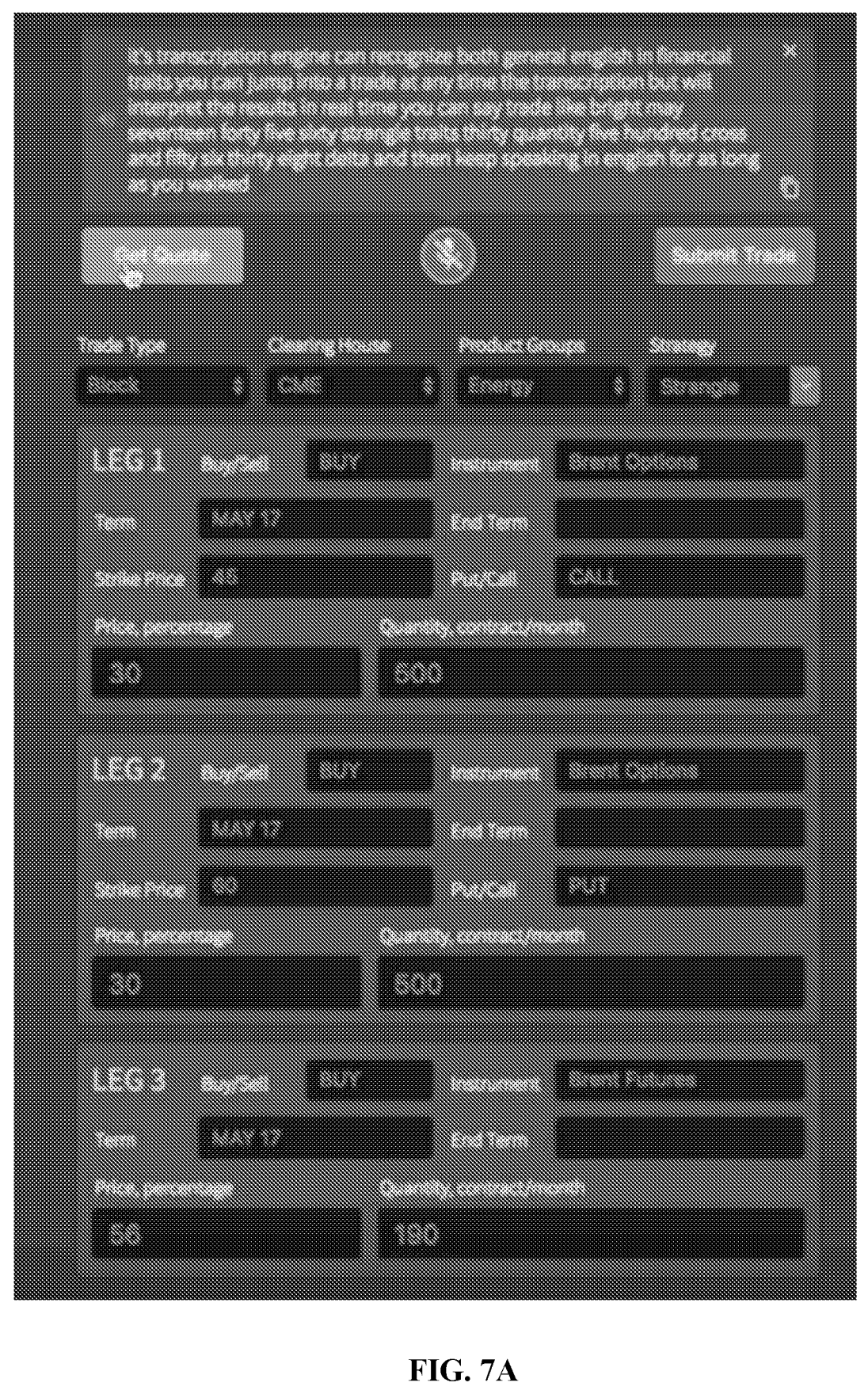

FIG. 7A shows a snapshot of another exemplary inventive interface which is configured/designed to illustrate how the exemplary inventive adaptive self-trained computer engine is configured/programmed to distinguish, in real time, different types of text (e.g., general English language and a specialized text (e.g., Financial language) as the user speaks, and, in real-time, acquire and process the user's voice recording in accordance with at least some inventive principles describe herein, and dynamically extract the specialized text and utilized the extracted specialized text to fill, in real time, trading information into an exemplary trading ticket.

Figure 7B:
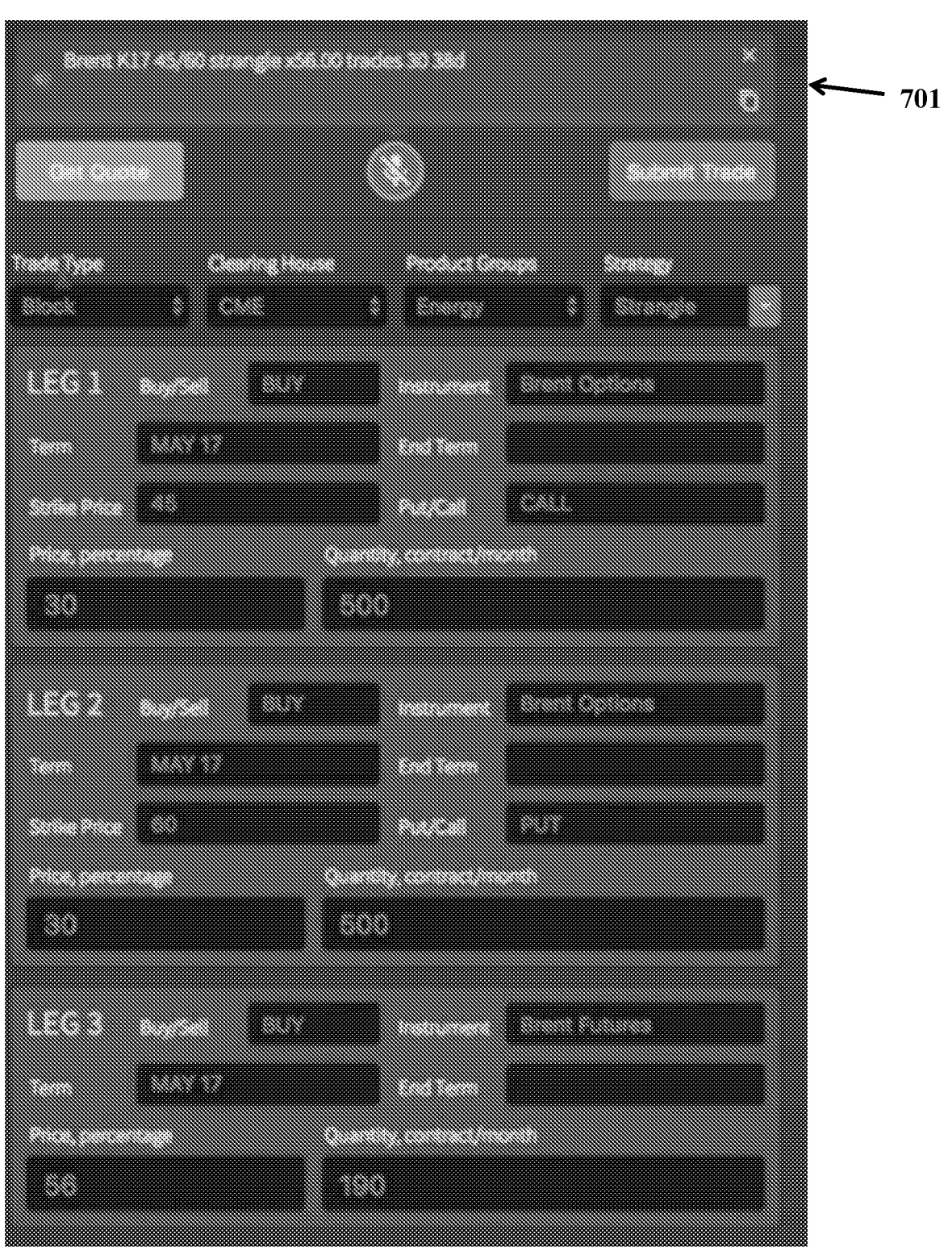

FIG. 7B shows a snapshot of the exemplary inventive interface of FIG. 7A with an instant message (701) which is representative of the trading ticket and is being now outputted by the exemplary inventive adaptive self-trained computer engine after the inventive processing performed in accordance with at least some inventive principles describe herein.

FIGS. 8A and 8B shows snapshots of outputs generated, in real time, by the exemplary inventive adaptive self-trained computer engine as a user speaks, where the outputs consist of at least:
  1) a transcript of the user's speech,
  2) structured data object metadata having matched/filtered particular word(s) from the transcript to respective property(ies) of particular data object(s)/structure(s), and
  3) a visual presentation of at least one instant message (the instant messenger string) that has been dynamically generated and transmitted by the exemplary inventive adaptive self-trained computer engine to one or more intended destinations (for example, in a case of the financial trading, the exemplary inventive adaptive self-trained computer engine may generate an instant electronic message with trading instruction to an execution venue (e.g., New York Stock Exchange, etc.).

In some embodiments, the exemplary inventive adaptive self-trained computer engine of the present invention may operate in a client-server computer architecture. In some embodiments, the exemplary inventive adaptive self-trained computer engine of the present invention may concurrently interact with a large number of users (e.g., at least 10; at least 100; at least 1,000; at least, 10,000; at least 1,000,000; etc.) and/or process a large number of concurrent transactions (e.g., at least 10; at least 100; at least 1,000; at least, 10,000; at least 1,000,000; etc.). In other embodiments, the exemplary inventive adaptive self-trained computer engine of the present invention is configured/programmed to operate in a scalable computer and network architecture that incorporates varies strategies for assessing the data, caching, searching, and database connection pooling. An example of the scalable architecture is an architecture that is capable of operating multiple servers.

In some embodiments, an exemplary client device has a microphone, a speaker and a display. In one embodiment, the client device includes a keypad having a plurality of buttons, which may be physical or touch-screen, configured such that each button is associated with one of the plurality of applications available on the client device. In one embodiment, the client device preferably also includes a user interface (UI) having a plurality of tabs configured such that each tab is associated with a plurality of user preferences. In one embodiment, the client device is a mobile phone or PDA or similar multi-purpose, multi-capability hand-held device.

The method may also include the steps of locating the position of the client device through, for example, a global positioning system (GPS) and listing locations, proximate to the position of the client device, of a target of interest presented in the training and/or operation (e.g., transcript generation and/or filtering) of the exemplary inventive adaptive self-trained computer engine of the present invention.

In some embodiments, the exemplary inventive adaptive self-trained computer engine of the present invention is configured/programmed to electronically communicate with virtually any computing device, including a mobile electronic device (e.g., smartphone) which is specifically programmed to receiving and sending messages over a computer network and has a voice recording capability. In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the exemplary inventive adaptive self-trained computer engine the present invention is configured/programmed to receive, generate, and/or transmit graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, the exemplary inventive adaptive self-trained computer engine the present invention is configured/programmed by utilizing computer languages such as, but not limited to, Java, .Net, QT, C, C++, Visual Basic, Python, Perl, JavaScript, and/or other suitable programming language.

In some embodiments, the exemplary inventive adaptive self-trained computer engine the present invention is configured/programmed to receive and send out electronic messages from and to another computing device employing various modes or protocols, such as GSM voice calls (Global System for Mobile communications), SMS (Short Message Service), EMS (Enhanced Messaging Service), or MIMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through a transceiver using a radio-frequency. In addition, short-range communication may occur, such as using a Bluetooth, WiFi, or other such transceiver (not shown). In addition, the exemplary mobile electronic device may have a GPS (Global Positioning System) receiver module which may provide additional navigation- and location-related wireless data to the mobile electronic device, which may be used as appropriate by applications running on the mobile electronic computing device.

In one example implementation, a multi-processor system may include a plurality of processor chips each of which includes at least one I/O component which is designed to directly connect to photonic components to connect to at least an I/O device. In some embodiments, the I/O device may be a standard interface, such as peripheral component interconnect express (PCIe), universal serial bus (USB), Ethernet, Infiniband, and the like. In some embodiments, the I/O device may include a storage device. In some embodiments, the I/O device may include a sensor or actuator.

In one example implementation, a multi-processor system may include plurality of photonic components and an off-chip memory. The off-chip memory may be shared by more than one of the processor chips. The off-chip memory may be directly connected to a single processor chip and shared with other processor chips using a global memory architecture implemented by using a processor-to-processor approach. The multi-processor system may also include a cache and a plurality of processor chips each of which includes at least one I/O component which is designed to directly connect to the photonic components to communicate with one or more other processor chips. At least one I/O component of at least one of the processor chips may be configured to use a directory-based cache-coherence protocol. In some embodiments, a cache of at least one of the processor chips may be configured to store directory information. In some embodiments, the off-chip memory may include a DRAM. In some embodiments, directory information may be stored in the off-chip memory and the on-chip cache of at least one of the processor chips. In some embodiments, the multi-processor system may further include a directory subsystem configured to separate the off-chip memory data and the directory information on to two different off-chip memories. In some embodiments, the multi-processor system may further include a directory subsystem configured with some of the subsystem implemented on a high performance chip which is part of the 3D DRAM memory stack. In some embodiments, the multi-processor system may further include a directory subsystem configured to support varying numbers of sharers per memory block. In some embodiments, the multi-processor system may further include a directory subsystem configured to support varying numbers of sharers per memory block using caching. In some embodiments, the multi-processor system may further include a directory subsystem configured to support varying numbers of sharers per memory block using hashing to entries with storage for different numbers of pointers to sharers. In some embodiments, the multi-processor system may further include a directory subsystem configured to use hashing to reduce storage allocated to memory blocks with zero sharers.

Figure 9:
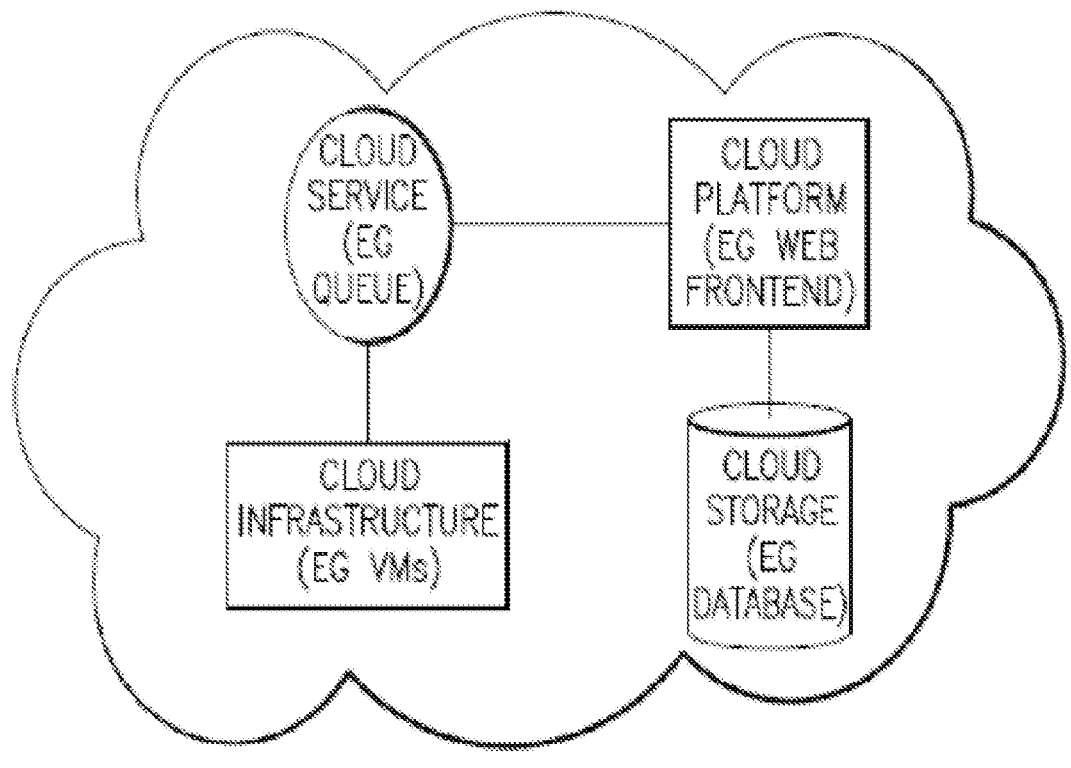
FIGS. 9-10 illustrate certain computer architectures in accordance with at least some principles of at least some embodiments of the present invention.
Figure 10:
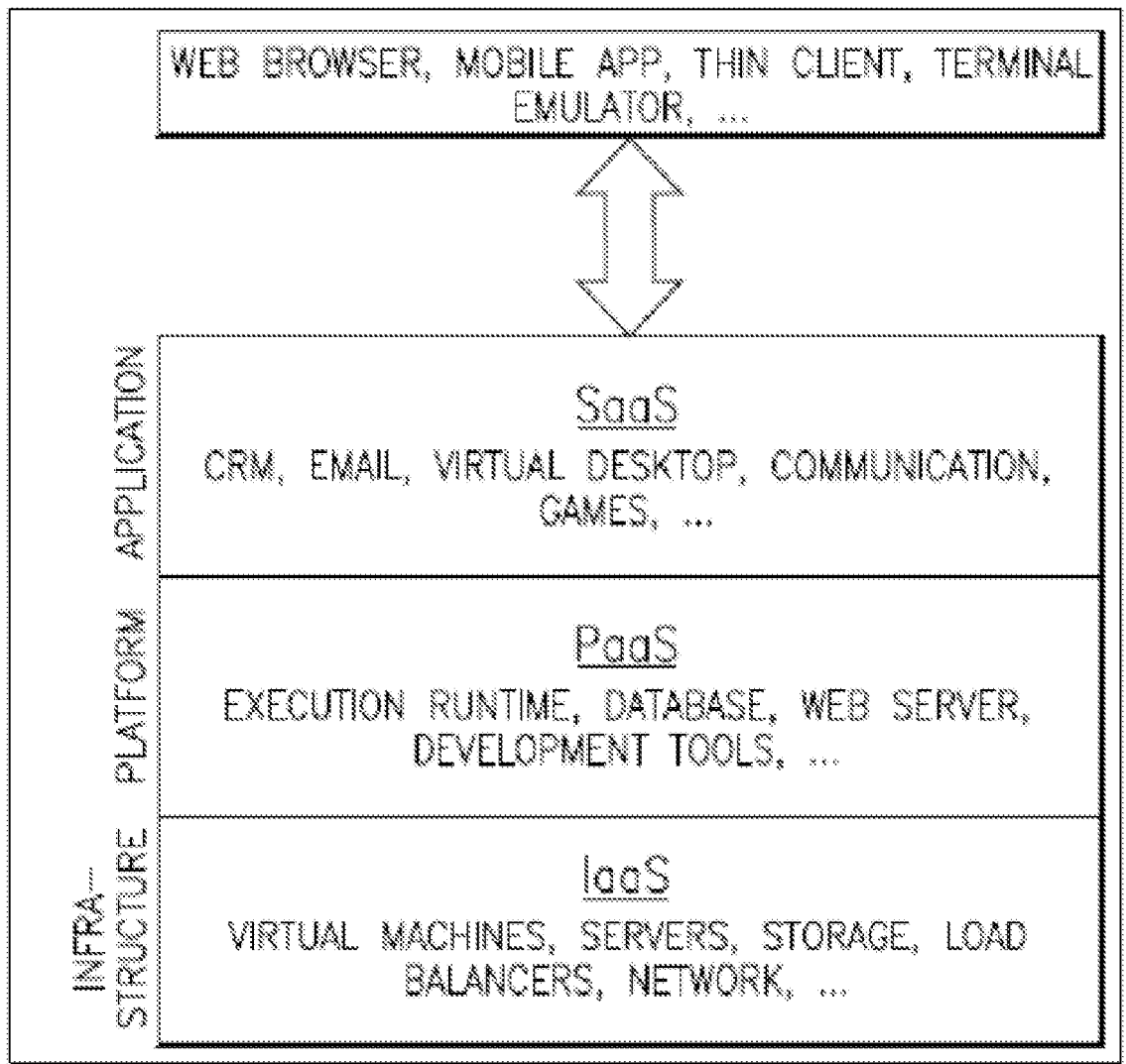

For purposes of the instant description, the terms "cloud," "Internet cloud," "cloud computing," "cloud architecture," and similar terms correspond to at least one of the following utilized by the exemplary inventive computer-programmed systems and the exemplary inventive computer-processing methods of the present invention: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the inventive computer flexible lease basis system offers/manages the cloud computing/architecture as, but not limiting to: infrastructure a service (IaaS), platform as a service (PaaS), and software as a service (SaaS). FIGS. 9 and 10 illustrate schematics of exemplary implementations of the cloud computing/architecture which the exemplary inventive adaptive self-trained computer engine the present invention is configured/programmed to utilize and/or interface with.

In some embodiments, the present invention provides for an exemplary computer system which includes at least the following components: at least one adaptive self-trained computer engine; at least one multi-core processor including a plurality of cores, where the at least one multi-core processor is associated with the at least one adaptive self-trained computer engine so that the at least one multi-core processor is configured to receive executing instructions from the at least one adaptive self-trained computer engine; where the computer system is configured to perform at least the following operations:

during a training stage:

electronically receiving, by the adaptive self-trained computer engine, an initial speech audio data generated by a microphone of a computing device, where the initial speech audio data corresponds to at least one initial utterance received by the microphone from a particular user where the at least one initial utterance corresponds to an initial text being read by the particular user; dynamically segmenting, by the adaptive self-trained computer engine, the initial speech audio data and the corresponding initial text into a plurality of user phonemes; dynamically querying, by the adaptive self-trained computer engine, at least one database object containing at least one computer dictionary of stored subject-specific phonetic pronunciations of subject-specific words which are related to a particular activity area to match the plurality of user phonemes to a plurality of subject-specific phonetic pronunciations to form a plurality of user-specific subject-specific phonemes; dynamically associating, by the adaptive self-trained computer engine, a plurality of first timestamps with the plurality of user-specific subject-specific phonemes, where each first timestamp corresponds to a time segment location of a respective matched user phoneme in the initial speech audio data so as to form at least one user-specific subject-specific data dictionary of timestamped user-specific subject-specific phonemes; dynamically generating, by the adaptive self-trained computer engine, a plurality of user-specific subject-specific training instructions by utilizing the at least one user-specific subject-specific data dictionary of timestamped user-specific subject-specific phonemes as a user-specific subject-specific speech training model, where each user-specific subject-specific training instruction includes a training text and a synthetized user-specific speech audio of the training text; dynamically outputting, by the adaptive self-trained computer engine, the training text of each user-specific subject-specific training instruction to the computing device; electronically receiving, by the adaptive self-trained computer engine, a training speech audio data generated by the microphone of the computing device, where the training speech audio data corresponds to a training utterance received by the microphone from the particular user where the training utterance corresponds to the training text of each user-specific subject-specific training instruction being read by the particular user; dynamically comparing, by the adaptive self-trained computer engine, the training speech audio data to the synthetized user-specific speech audio of the training text to train the user-specific subject-specific speech training model;

during a transcription stage:

electronically receiving, by the adaptive self-trained computer engine, to-be-transcribed speech audio data of at least one user, where the to-be-transcribed speech audio data corresponds to at least one to-be-transcribed utterance received from the at least one user; dynamically splitting, by the adaptive self-trained computer engine, the to-be transcribed speech audio data into a plurality of to-be-transcribed speech audio segments, where the splitting is at points of silence to form, after each split, two to-be-transcribed speech audio segments with an identical non-silent audio portion; dynamically associating, by the adaptive self-trained computer engine, a plurality of second timestamps with the plurality of to-be-transcribed speech audio segments, where each second timestamp corresponds to a particular time segment location of a respective to-be-transcribed speech audio segment in the to-be-transcribed speech audio data so as to form a plurality of timestamped to-be-transcribed speech audio segments; dynamically assigning, by the adaptive self-trained computer engine, each timestamped to-be-transcribed speech audio segment of the plurality of timestamped to-be-transcribed speech audio segments to a particular core of the plurality of cores of the at least one multi-core processor; dynamically transcribing, in parallel, by the at least one multi-core processor, the plurality of time-stamped to-be-transcribed speech audio segments based, at least in part, on the user-specific subject-specific speech training model of the at least one user to generate a plurality of text transcript segments corresponding to the plurality of timestamped to-be-transcribed speech audio segments; where the at least one multi-core processor is configured to dynamically transcribe the plurality of timestamped to-be-transcribed speech audio segments at a transcription rate which is at least n time faster than an average human speech; dynamically assembling, by the adaptive self-trained computer engine, the plurality of text transcript segments into a user-specific subject-specific output transcript of the to-be-transcribed speech audio data, based, at least in part, on the plurality of second timestamps; dynamically verifying, by the adaptive self-trained computer engine, an accuracy of the user-specific subject-specific output transcript of the to-be-transcribed speech audio data to form a verified user-specific subject-specific output transcript of the to-be-transcribed speech audio data; and dynamically and simultaneously applying, by the adaptive self-trained computer engine, a plurality of filters to the verified user-specific subject-specific output transcript to determine at least one subject-specific message of the at least one user in the to-be-transcribed speech audio data, where each filter is a data structure characterizing at least one subject-specific property of at least one particular subject-specific term and at least one context parameter identifying at least one context in which the at least one particular subject-specific term is expected to be used in the particular activity area.

In some embodiments, where the exemplary computer system is further configured to perform at least the following operations: dynamically analyzing, by the adaptive self-trained computer engine, a frequency spectrum of the initial speech audio data, the training speech audio data, or both, to generate a speaker profile of the particular user.

In some embodiments, the analyzing of the frequency spectrum is based, at least in part, on at least one parameter selected from the group consisting of: mean frequency, standard deviation, median, first quartile, third quartile, interquartile range, skewness, kurtosis, spectral entropy, spectral centroid, spectral spread, spectral flux, spectral rolloff, spectral flatness, mode, peak frequency, average and minimum (min) and maximum (max) fundamental frequency, average and min and max dominant frequency, range of dominant frequency, modulation index, zero crossing rate, energy, entropy of energy, Mel frequency cepstral coefficients (MFCCs), chroma vector, and chroma deviation.

In some embodiments, where the computer system is further configured to perform at least the following operations, during the training stage, dynamically storing, by the adaptive self-trained computer engine, the digital speaker profile of the user in a database of digital speaker profiles of a plurality of users.

In some embodiments, the computer system is further configured to perform at least the following operations, during the transcription stage, dynamically analyzing, by the adaptive self-trained computer engine, at least two adjacent to-be-transcribed speech audio segments of the plurality of to-be-transcribed speech audio segments to determine that the at least two adjacent to-be-transcribed speech audio segments comprise utterances received from a plurality of users when at least one first audio feature of at least one first to-be-transcribed speech audio segment of the at least two adjacent to-be-transcribed speech audio segments, which is representative of to-be-transcribed speech audio data of a first user, differs from at least one second audio feature of at least one second to-be-transcribed speech audio segment of the at least two adjacent to-be-transcribed speech audio segments which is representative of to-be-transcribed speech audio data of a second user.

In some embodiments, the computer system is further configured to perform at least the following operations, during the transcription stage, dynamically identifying, by the adaptive self-trained computer engine, the plurality of users based on the database of digital speaker profiles.

In some embodiments, the dynamically verifying the accuracy of the user-specific subject-specific output transcript of the to-be-transcribed speech audio data includes dynamically comparing, by the adaptive self-trained computer engine, phonetically-similar letter pairs of the user-specific subject-specific output transcript of the to-be-transcribed speech audio data to at least one library of subject-specific terms.

In some embodiments, the dynamically verifying the accuracy of the user-specific subject-specific output transcript of the to-be-transcribed speech audio data includes dynamically removing, by the adaptive self-trained computer engine, at least one duplicate instances of words in overlapping text transcript segments In some embodiments, the dynamically and simultaneously applying the plurality of filters to the verified user-specific subject-specific output transcript further includes dynamically evaluating, by the adaptive self-trained computer engine, at least one mistakenly transcribed word as a correctly transcribed word when a pre-determined number of pairs of letters match between the at least one mistakenly transcribed word and at least one subject-specific term of the at least one library of subject-specific terms.

In some embodiments, the particular activity area is an area of financial trading and the at least one context parameter is selected from the group consisting of a number, a time period, a financial trading keyword, and any combinations thereof.

In some embodiments, the at least one library of subject-specific terms is a library of financial trading terms.

In some embodiments, the at least one first audio feature and the at least one second audio feature are based on at least one statistical parameter of the frequency spectrum of the at least two adjacent to-be-transcribed speech audio segments; and where the at least one first audio feature differs from the at least one second audio feature when at least one first value of the at least one statistical parameter of the frequency spectrum of the at least one first to-be-transcribed speech audio segment or at least one second value of the at least one statistical parameter of the frequency spectrum of the at least one second to-be-transcribed speech audio segment exceeds a pre-determined tolerance level.

In some embodiments, the determination of the at least one statistical parameter of the frequency spectrum is based on statistical clustering; and where the at least one statistical parameter is selected from the group consisting of: mean frequency, standard deviation, median, first quartile, third quartile, interquartile range, skewness, kurtosis, spectral entropy, spectral centroid, spectral spread, spectral flux, spectral rolloff, spectral flatness, mode, peak frequency, average and minimum (min) and maximum (max) fundamental frequency, average and min and max dominant frequency, range of dominant frequency, modulation index, zero crossing rate, energy, entropy of energy, Mel frequency cepstral coefficients (MFCCs), chroma vector, and chroma deviation.

In some embodiments, the determination that the at least one first audio feature differ from the at least one second audio feature based on an output of a pre-trained machine classifier model.

In some embodiments, the present invention provides for an exemplary computer-implemented method which includes at least steps of:

during a training stage:

electronically receiving, by an adaptive self-trained computer engine associated with at least one multi-core processor including a plurality of cores, an initial speech audio data generated by a microphone of a computing device, where the initial speech audio data corresponds to at least one initial utterance received by the microphone from a particular user where the at least one initial utterance corresponds to an initial text being read by the particular user; dynamically segmenting, by the adaptive self-trained computer engine, the initial speech audio data and the corresponding initial text into a plurality of user phonemes; dynamically querying, by the adaptive self-trained computer engine, at least one database object containing at least one computer dictionary of stored subject-specific phonetic pronunciations of subject-specific words which are related to a particular activity area to match the plurality of user phonemes to a plurality of subject-specific phonetic pronunciations to form a plurality of user-specific subject-specific phonemes; dynamically associating, by the adaptive self-trained computer engine, a plurality of first timestamps with the plurality of user-specific subject-specific phonemes, where each first timestamp corresponds to a time segment location of a respective matched user phoneme in the initial speech audio data so as to form at least one user-specific subject-specific data dictionary of timestamped user-specific subject-specific phonemes; dynamically generating, by the adaptive self-trained computer engine, a plurality of user-specific subject-specific training instructions by utilizing the at least one user-specific subject-specific data dictionary of timestamped user-specific subject-specific phonemes as a user-specific subject-specific speech training model, where each user-specific subject-specific training instruction includes a training text and a synthetized user-specific speech audio of the training text; dynamically outputting, by the adaptive self-trained computer engine, the training text of each user-specific subject-specific training instruction to the computing device; electronically receiving, by the adaptive self-trained computer engine, a training speech audio data generated by the microphone of the computing device, where the training speech audio data corresponds to a training utterance received by the microphone from the particular user where the training utterance corresponds to the training text of each user-specific subject-specific training instruction being read by the particular user; dynamically comparing, by the adaptive self-trained computer engine, the training speech audio data to the synthetized user-specific speech audio of the training text to train the user-specific subject-specific speech training model;

during a transcription stage:

electronically receiving, by the adaptive self-trained computer engine, to-be-transcribed speech audio data of at least one user, where the to-be-transcribed speech audio data corresponds to at least one to-be-transcribed utterance received from the at least one user; dynamically splitting, by the adaptive self-trained computer engine, the to-be transcribed speech audio data into a plurality of to-be-transcribed speech audio segments, where the splitting is at points of silence to form, after each split, two to-be-transcribed speech audio segments with an identical non-silent audio portion; dynamically associating, by the adaptive self-trained computer engine, a plurality of second timestamps with the plurality of to-be-transcribed speech audio segments, where each second timestamp corresponds to a particular time segment location of a respective to-be-transcribed speech audio segment in the to-be-transcribed speech audio data so as to form a plurality of timestamped to-be-transcribed speech audio segments; dynamically assigning, by the adaptive self-trained computer engine, each timestamped to-be-transcribed speech audio segment of the plurality of timestamped to-be-transcribed speech audio segments to a particular core of the plurality of cores of the at least one processor; dynamically transcribing, in parallel, by the at least one multi-core processor, the plurality of timestamped to-be-transcribed speech audio segments based, at least in part, on the user-specific subject-specific speech training model of the at least one user to generate a plurality of text transcript segments corresponding to the plurality of timestamped to-be-transcribed speech audio segments; where the adaptive self-trained computer engine is configured to dynamically transcribe the plurality of timestamped to-be-transcribed speech audio segments at a transcription rate which is at least n time faster than an average human speech; dynamically assembling, by the adaptive self-trained computer engine, the plurality of text transcript segments into a user-specific subject-specific output transcript of the to-be-transcribed speech audio data, based, at least in part, on the plurality of second timestamps; dynamically verifying, by the adaptive self-trained computer engine, an accuracy of the user-specific subject-specific output transcript of the to-be-transcribed speech audio data to form a verified user-specific subject-specific output transcript of the to-be-transcribed speech audio data; and dynamically and simultaneously applying, by the adaptive self-trained computer engine, a plurality of filters to the verified user-specific subject-specific output transcript to determine at least one subject-specific message of the at least one user in the to-be-transcribed speech audio data, where each filter is a data structure characterizing at least one subject-specific property of at least one particular subject-specific term and at least one context parameter identifying at least one context in which the at least one particular subject-specific term is expected to be used in the particular activity area.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A computer system, comprising:

a multi-core processor including a plurality of cores, the multi-core processor is operable:

to differentiate between a first speaker and a second speaker in an audio stream of speech by analyzing frequency spectrum characteristics including at least one parameter selected from mean frequency, spectral entropy, spectral centroid, and spectral spread, to convert the audio stream into text by dynamically splitting the audio stream into a plurality of overlapping audio segments with identical non-silent audio portions and processing the overlapping audio segments in parallel through different cores of the multi-core processor at an accelerated transcription rate, and to generate time stamps to associate the text with the audio stream; and a machine learning module implemented by the multi-core processor:

to access pre-learned phonemes stored in a subject-specific phonetic pronunciation database, to identify the first speaker in the audio stream based on the pre-learned phonemes and the frequency spectrum characteristics, to locate a portion of the text associated with the first speaker based on the time stamps, to segment the text associated with the first speaker into text phonemes, to dynamically compare phonetically-similar letter pairs of the text phonemes to at least one library of subject-specific terms, and to compare the text phonemes to the pre-learned phonemes of the first speaker to correct the text associated with the first speaker in real-time based on the pre-learned phonemes by replacing mistakenly transcribed words when a predetermined number of letter pairs match between the mistakenly transcribed word and a subject-specific term, and removing duplicate instances of words in overlapping text transcript segments to generate a cleaned verified transcript.

2. The computer system of claim 1, wherein:

the machine learning module, during a training stage, is further operable:

to process speech of the first speaker, to learn phonemes of the first speaker, to build a profile of the first speaker in a database, and to store the phonemes of the first speaker as the pre-learned phonemes of the first speaker in the profile of the first speaker of the database.

3. The computer system of claim 1, wherein:

the multi-core processor is operable to dynamically balance processing loads across the plurality of cores based on segment complexity.

4. The computer system of claim 1, further comprising:

a user interface configured with text inputs, wherein the machine learning module is further operable to auto-fill the corrected text associated with the first speaker in at least one of the text inputs of the user interface.

5. The computer system of claim 4, wherein: the machine learning module is further operable to process a correction audibly made by the first speaker, and to auto-fill the audibly made correction in the at least one text input of the user interface.

6. The computer system of claim 1, wherein: at least a portion of the pre-learned phonemes comprises subject specific phonemes.

7. The computer system of claim 1, wherein:

the machine learning module is further operable to remove duplicated words in the text associated with the first speaker.

8. A method, comprising:

differentiating between a first speaker and a second speaker in an audio stream of speech by analyzing frequency spectrum characteristics including at least one parameter selected from mean frequency, spectral entropy, spectral centroid, and spectral spread using a multi-core processor;

converting the audio stream into text by dynamically splitting the audio stream into a plurality of overlapping audio segments with identical non-silent audio portions and processing the overlapping audio segments in parallel through different cores of the multi-core processor at an accelerated transcription rate;

generating time stamps in the audio stream to associate the text with the audio stream;

accessing pre-learned phonemes;

identifying the first speaker based on the pre-learned phonemes and the frequency spectrum characteristics;

locating a portion of the text associated with the first speaker based on the time stamps;

segmenting the text associated with the first speaker into text phonemes;

dynamically comparing phonetically-similar letter pairs of the text phonemes to at least one library of subject-specific terms; and comparing the text phonemes to the pre-learned phonemes of the first speaker to correct the text associated with the first speaker in real-time based on the pre-learned phonemes by replacing mistakenly transcribed words when a predetermined number of letter pairs match between the mistakenly transcribed word and a subject-specific term, and removing duplicate instances of words in overlapping text transcript segments to generate a cleaned verified transcript.

9. The method of claim 8, further comprising:

during a training stage, processing speech of the first speaker;

learning phonemes of the first speaker;

building a profile of the first speaker in a database; and storing the phonemes of the first speaker as the pre-learned phonemes of the first speaker in the profile of the first speaker of the database.

10. The method of claim 8, further comprising:

dynamically adjusting overlap duration between audio segments based on speech pattern complexity.

11. The method of claim 8, further comprising:

auto-filling the corrected text associated with the first speaker in at least one text input of a user interface as the first speaker speaks.

12. The method of claim 11, further comprising:

processing a correction audibly made by the first speaker; and auto-filling the audibly made correction in the at least one text input of the user interface.

13. The method of claim 8, wherein: at least a portion of the pre-learned phonemes comprises subject specific phonemes.

14. The method of claim 8, further comprising:

generating confidence metrics for each corrected word based on phonetic similarity scores.

15. A non-transitory computer readable medium comprising computer readable instructions that, when executed by a multi-core processor, direct the multi-core processor to:

differentiate between a first speaker and a second speaker in an audio stream of speech by analyzing frequency spectrum characteristics including at least one parameter selected from mean frequency, spectral entropy, spectral centroid, and spectral spread;

convert the audio stream into text by dynamically splitting the audio stream into a plurality of overlapping audio segments with identical non-silent audio portions and processing the overlapping audio segments in parallel through different cores of the multi-core processor at an accelerated transcription rate;

generate time stamps to associate the text with the audio stream;

access pre-learned phonemes from a subject-specific phonetic pronunciation database;

identify the first speaker in the audio stream based on the pre-learned phonemes and the frequency spectrum characteristics;

locate a portion of the text associated with the first speaker based on the time stamps;

segment the text associated with the first speaker into text phonemes;

dynamically compare phonetically-similar letter pairs of the text phonemes to at least one library of subject-specific terms; and compare the text phonemes to the pre-learned phonemes of the first speaker to correct the text associated with the first speaker in real-time based on the pre-learned phonemes by replacing mistakenly transcribed words when a predetermined number of letter pairs match between the mistakenly transcribed word and a subject-specific term, and removing duplicate instances of words in overlapping text transcript segments to generate a cleaned verified transcript.

16. The computer readable medium of claim 15, wherein the multi-core processor is further configured to execute the computer readable instructions to:

during a training stage, process speech of the first speaker;

learn phonemes of the first speaker;

build a profile of the first speaker in a database; and store the phonemes of the first speaker as the pre-learned phonemes of the first speaker in the profile of the first speaker of the database.

17. The computer readable medium of claim 15, wherein the multi-core processor is further configured to execute the computer readable instructions to:

dynamically allocate processing resources among the different cores based on real-time audio stream characteristics.

18. The computer readable medium of claim 15, wherein the multi-core processor is further configured to execute the computer readable instructions to:

auto-fill the corrected text associated with the first speaker in at least one text input of a user interface as the first speaker speaks.

19. The computer readable medium of claim 18, wherein the multi-core processor is further configured to execute the computer readable instructions to:

process a correction audibly made by the first speaker; and auto-fill the audibly made correction in the at least one text input of the user interface.

20. The computer readable medium of claim 15, wherein the multi-core processor is further configured to execute the computer readable instructions to:

maintain error correction statistics for improvement of phonetic matching accuracy.

* * * * *